United States Patent
Brocard et al.

(10) Patent No.: US 12,498,493 B2
(45) Date of Patent: Dec. 16, 2025

(54) SYSTEM AND METHOD FOR DISTRIBUTED INTEGRITY MONITORING

(71) Applicant: Swift Navigation, Inc., San Francisco, CA (US)

(72) Inventors: Philippe Brocard, San Francisco, CA (US); Alex Parkins, San Francisco, CA (US); Sébastien Carcanague, San Francisco, CA (US); James Tidd, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 294 days.

(21) Appl. No.: 18/491,167

(22) Filed: Oct. 20, 2023

(65) Prior Publication Data

US 2024/0134065 A1    Apr. 25, 2024
US 2024/0230923 A9    Jul. 11, 2024

Related U.S. Application Data

(60) Provisional application No. 63/418,354, filed on Oct. 21, 2022.

(51) Int. Cl.
*G01S 19/40*     (2010.01)
*G01S 19/44*     (2010.01)

(52) U.S. Cl.
CPC .............. *G01S 19/40* (2013.01); *G01S 19/44* (2013.01)

(58) Field of Classification Search
CPC ................................. G01S 19/40; G01S 19/44
USPC ..................................................... 342/357.23
See application file for complete search history.

(56) References Cited

U.S. PATENT DOCUMENTS

| | | |
|---|---|---|
| 5,451,964 A | 9/1995 | Babu |
| 5,610,614 A | 3/1997 | Talbot et al. |
| 5,825,326 A | 10/1998 | Semler et al. |
| 5,867,411 A | 2/1999 | Kumar |
| 5,935,196 A | 8/1999 | Brodie et al. |
| 5,991,691 A | 11/1999 | Johnson |
| 6,009,376 A | 12/1999 | Brodie et al. |
| 6,127,968 A | 10/2000 | Lu |
| 6,205,400 B1 | 3/2001 | Lin |
| 6,408,245 B1 | 6/2002 | An et al. |
| 6,424,914 B1 | 7/2002 | Lin |

(Continued)

FOREIGN PATENT DOCUMENTS

| | | |
|---|---|---|
| CA | 2718988 C | 1/2014 |
| CA | 3079279 A1 | 10/2020 |

(Continued)

OTHER PUBLICATIONS

Blanch, Juan , et al., "Gaussian Bounding Improvements and an Analysis of the Bias-sigma Tradeoff for GNSS Integrity", Proceedings of the 2021 International Technical Meeting of The Institute of Navigation, Jan. 2021, pp. 703-713.

(Continued)

*Primary Examiner* — Harry K Liu
(74) *Attorney, Agent, or Firm* — Jeffrey Schox; Randy Mehlenbacher

(57) ABSTRACT

A method can include receiving satellite observations, determining GNSS corrections, monitoring the GNSS corrections, transmitting the GNSS corrections and monitor result, and determining a GNSS receiver positioning solution.

20 Claims, 7 Drawing Sheets

(56) References Cited

U.S. PATENT DOCUMENTS

| | | |
|---|---|---|
| 6,427,122 B1 | 7/2002 | Lin |
| 6,453,237 B1 | 9/2002 | Fuchs et al. |
| 6,552,680 B1 | 4/2003 | Barber et al. |
| 6,628,231 B2 | 9/2003 | Mayersak |
| 6,647,340 B1 | 11/2003 | Pemble et al. |
| 6,691,066 B1 | 2/2004 | Brodie |
| 6,727,849 B1 | 4/2004 | Kirk et al. |
| 6,735,264 B2 | 5/2004 | Miller |
| 6,753,810 B1 | 6/2004 | Yang et al. |
| 6,799,116 B2 | 9/2004 | Robbins |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 7,746,272 B2 | 6/2010 | Vollath |
| 8,013,789 B2 | 9/2011 | Van et al. |
| 8,027,413 B2 | 9/2011 | Lillo et al. |
| 8,085,190 B2 | 12/2011 | Sengupta et al. |
| 8,089,402 B2 | 1/2012 | Maenpa et al. |
| 8,094,065 B2 | 1/2012 | Henkel |
| 8,134,497 B2 | 3/2012 | Janky et al. |
| 8,193,976 B2 | 6/2012 | Shen et al. |
| 8,255,155 B1 | 8/2012 | Crane et al. |
| 8,368,590 B2 | 2/2013 | Vollath et al. |
| 8,368,591 B2 | 2/2013 | Talbot et al. |
| 8,416,133 B2 | 4/2013 | Hatch et al. |
| 8,447,517 B2 | 5/2013 | Roh |
| 8,510,041 B1 | 8/2013 | Anguelov et al. |
| 8,542,146 B2 | 9/2013 | Vollath |
| 8,587,475 B2 | 11/2013 | Leandro |
| 8,610,624 B2 | 12/2013 | Savoy |
| 8,704,708 B2 | 4/2014 | Vollath |
| 8,704,709 B2 | 4/2014 | Vollath et al. |
| 8,756,001 B2 | 6/2014 | Georgy et al. |
| 8,760,343 B2 | 6/2014 | Milyutin et al. |
| 8,773,303 B2 | 7/2014 | Doucet et al. |
| 8,816,903 B2 | 8/2014 | Sengupta et al. |
| 8,825,456 B2 | 9/2014 | Vasudevan et al. |
| 8,830,121 B2 | 9/2014 | Vollath |
| 8,831,877 B2 | 9/2014 | Anguelov et al. |
| 8,847,820 B2 | 9/2014 | Landau et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,146,319 B2 | 9/2015 | Leandro |
| 9,182,497 B2 | 11/2015 | Geier et al. |
| 9,244,177 B2 | 1/2016 | Terashima |
| 9,405,012 B2 | 8/2016 | Doucet et al. |
| 9,405,016 B2 | 8/2016 | Yim |
| 9,417,330 B2 | 8/2016 | Revol et al. |
| 9,557,422 B1 | 1/2017 | Miller et al. |
| 9,568,321 B2 | 2/2017 | Bharadwaj et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,651,667 B2 | 5/2017 | Leandro et al. |
| 9,671,501 B2 | 6/2017 | Leandro et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,274,606 B1 | 4/2019 | Phan et al. |
| 10,422,885 B2 | 9/2019 | Dai et al. |
| 10,459,593 B2 | 10/2019 | Tiwari et al. |
| 10,473,790 B2 | 11/2019 | Noble et al. |
| 10,564,296 B2 | 2/2020 | Hide et al. |
| 10,578,747 B2 | 3/2020 | Grgich et al. |
| 10,627,527 B2 | 4/2020 | Horn et al. |
| 10,677,933 B1 | 6/2020 | Gavrilets et al. |
| 10,690,775 B2 | 6/2020 | Jokinen |
| 10,802,160 B2 | 10/2020 | Dai et al. |
| 10,809,388 B1* | 10/2020 | Carcanague ............ G01S 19/07 |
| 10,871,579 B2 | 12/2020 | Segal et al. |
| 10,901,096 B2 | 1/2021 | Thrasher et al. |
| 11,035,961 B2 | 6/2021 | Horn et al. |
| 11,131,774 B2 | 9/2021 | Miya et al. |
| 11,143,762 B2 | 10/2021 | Takahashi et al. |
| 11,156,718 B2 | 10/2021 | Takeda |
| 11,187,813 B2 | 11/2021 | Brandl et al. |
| 11,221,418 B2 | 1/2022 | Sleewaegen et al. |
| 11,237,276 B2 | 2/2022 | Kleeman |
| 11,255,976 B2 | 2/2022 | Strobel et al. |
| 11,259,141 B2 | 2/2022 | Li et al. |
| 11,327,182 B2 | 5/2022 | Zalewski et al. |
| 11,333,772 B2 | 5/2022 | Del Regno et al. |
| 11,378,699 B2 | 7/2022 | Segal et al. |
| 11,422,269 B2 | 8/2022 | Ookubo et al. |
| 11,422,271 B2 | 8/2022 | Talbot et al. |
| 11,480,690 B2 | 10/2022 | Grgich et al. |
| 11,624,838 B2 | 4/2023 | Fine et al. |
| 11,693,120 B2 | 7/2023 | Angelo et al. |
| 11,774,602 B1* | 10/2023 | Laine ................. G01C 21/1654 |
| | | 342/357.32 |
| 12,415,525 B1* | 9/2025 | Automata ............. B60W 50/14 |
| 2002/0097184 A1 | 7/2002 | Mayersak |
| 2002/0120400 A1 | 8/2002 | Lin |
| 2002/0180641 A1 | 12/2002 | Fink et al. |
| 2003/0081705 A1 | 5/2003 | Miller |
| 2003/0085840 A1 | 5/2003 | Benner et al. |
| 2004/0006424 A1 | 1/2004 | Joyce et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2005/0203702 A1 | 9/2005 | Sharpe et al. |
| 2006/0074558 A1 | 4/2006 | Williamson et al. |
| 2007/0120733 A1 | 5/2007 | Vollath et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0243929 A1 | 10/2009 | Sengupta et al. |
| 2009/0262013 A1 | 10/2009 | Vollath |
| 2009/0273511 A1 | 11/2009 | Schroth |
| 2010/0033370 A1 | 2/2010 | Lopez et al. |
| 2010/0164788 A1* | 7/2010 | Ghaida .................. G01S 19/41 |
| | | 342/357.23 |
| 2010/0164789 A1 | 7/2010 | Basnayake |
| 2010/0207810 A1 | 8/2010 | Terashima |
| 2010/0283675 A1 | 11/2010 | Mcaree et al. |
| 2010/0324822 A1 | 12/2010 | Coatantiec et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0156949 A1 | 6/2011 | Vollath et al. |
| 2011/0187589 A1 | 8/2011 | Gaal et al. |
| 2011/0187590 A1 | 8/2011 | Leandro |
| 2011/0260914 A1 | 10/2011 | Vollath et al. |
| 2011/0267226 A1 | 11/2011 | Talbot et al. |
| 2011/0316740 A1 | 12/2011 | Waters et al. |
| 2012/0112961 A1 | 5/2012 | Sengupta et al. |
| 2012/0146847 A1 | 6/2012 | Janky et al. |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0173195 A1 | 7/2012 | Opshaug et al. |

(56) References Cited

U.S. PATENT DOCUMENTS

| | | |
|---|---|---|
| 2012/0176271 A1 | 7/2012 | Dai et al. |
| 2012/0286991 A1 | 11/2012 | Chen et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0325328 A1 | 12/2013 | Anguelov et al. |
| 2013/0335264 A1 | 12/2013 | Revol et al. |
| 2014/0002300 A1 | 1/2014 | Leandro et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0288825 A1 | 9/2014 | Czompo et al. |
| 2015/0019464 A1 | 1/2015 | Nguyen-Tuong et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0116601 A1 | 4/2016 | Horn et al. |
| 2016/0195617 A1 | 7/2016 | Phatak et al. |
| 2016/0320493 A1 | 11/2016 | Wu et al. |
| 2017/0010936 A1 | 1/2017 | Daoud et al. |
| 2017/0131407 A1 | 5/2017 | Dunik et al. |
| 2017/0192102 A1 | 7/2017 | Wietfeldt |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0091939 A1 | 3/2018 | Venkatraman et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0180743 A1 | 6/2018 | Hide et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0041658 A1 | 2/2020 | Laurichesse |
| 2020/0096649 A1 | 3/2020 | Brandl et al. |
| 2020/0158886 A1 | 5/2020 | Segal et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0271795 A1 | 8/2020 | Horn et al. |
| 2020/0348422 A1 | 11/2020 | Carcanague et al. |
| 2020/0408926 A1 | 12/2020 | Carcanague et al. |
| 2021/0033735 A1 | 2/2021 | Kleeman |
| 2021/0072407 A1 | 3/2021 | Talbot et al. |
| 2021/0116579 A1 | 4/2021 | Rezaei |
| 2021/0141099 A1 | 5/2021 | Gunnarsson et al. |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0239845 A1 | 8/2021 | Sheret et al. |
| 2021/0372793 A1 | 12/2021 | Nikulin et al. |
| 2021/0405213 A1 | 12/2021 | Tuck et al. |
| 2022/0011443 A1 | 1/2022 | De Wilde et al. |
| 2022/0018969 A1 | 1/2022 | Fine et al. |
| 2022/0057523 A1 | 2/2022 | Lee |
| 2022/0058322 A1 | 2/2022 | Brandl et al. |
| 2022/0107427 A1 | 4/2022 | Kleeman et al. |
| 2022/0163677 A1 | 5/2022 | Muthuraman et al. |
| 2022/0171053 A1 | 6/2022 | Park et al. |
| 2022/0317310 A1 | 10/2022 | He et al. |
| 2022/0397684 A1 | 12/2022 | Kee et al. |
| 2023/0026395 A1 | 1/2023 | Reimer et al. |
| 2023/0140535 A1 | 5/2023 | Ma et al. |
| 2023/0184956 A1 | 6/2023 | Cole et al. |
| 2024/0134065 A1 | 4/2024 | Brocard |

FOREIGN PATENT DOCUMENTS

| | | | |
|---|---|---|---|
| CN | 101166995 A | 4/2008 | |
| CN | 103197327 A | 7/2013 | |
| CN | 103760573 A | 4/2014 | |
| CN | 104236522 A | 12/2014 | |
| CN | 104732085 A | 6/2015 | |
| CN | 106970404 A | 7/2017 | |
| CN | 107085626 A | 8/2017 | |
| CN | 105629263 B | 4/2019 | |
| CN | 107422354 B | 6/2019 | |
| CN | 110727002 A | 1/2020 | |
| CN | 111272174 A | 6/2020 | |
| CN | 109900309 B | 3/2021 | |
| CN | 112526569 A | 3/2021 | |
| CN | 109714421 B | 8/2021 | |
| CN | 111624630 B | 2/2022 | |
| CN | 114174850 A | 3/2022 | |
| DE | 102017212603 A1 | 1/2019 | |
| DE | 102018202223 A1 | 8/2019 | |
| EP | 0244091 A2 | 11/1987 | |
| EP | 0461557 B1 | 12/1997 | |
| EP | 1729145 A1 | 12/2006 | |
| EP | 2128841 A1 | 12/2009 | |
| EP | 2602752 A1 | 6/2013 | |
| EP | 1839070 B2 | 4/2014 | |
| EP | 2966477 A1 | 1/2016 | |
| EP | 2156214 B1 | 8/2018 | |
| EP | 3158293 B1 | 1/2019 | |
| EP | 3627188 A1 | 3/2020 | |
| EP | 3566021 B1 | 3/2021 | |
| EP | 3809208 A1 | 4/2021 | |
| EP | 3828595 A1 | 6/2021 | |
| EP | 3963352 A1 | 3/2022 | |
| KR | 101181990 B1 | 9/2012 | |
| KR | 101446427 B1 * | 10/2014 | ............ G01S 19/23 |
| WO | 02061449 A1 | 8/2002 | |
| WO | 2015099194 A1 | 7/2015 | |
| WO | 2017046914 A1 | 3/2017 | |
| WO | 2017070732 A1 | 5/2017 | |
| WO | 2018188845 A1 | 10/2018 | |
| WO | 2020240307 A1 | 12/2020 | |

OTHER PUBLICATIONS

Brocard, Philippe, et al., "System and Method for Bounding a Satellite Positioning Solution Integrity", U.S. Appl. No. 18/537,212, filed Dec. 12, 2023.

Chen, X., et al., "New Tools for Network RTK Integrity Monitoring", Proceedings of the 16th International Technical Meeting of the Satellite Division of The Institute of Navigation (ION GPS/GNSS 2003) Sep. 9-12, 2003 Oregon Convention Center, Portland, OR, Abstract only.

Cinque, Daniele, et al., "Experimental Validation of a High Precision GNSS System for Monitoring of Civil Infrastructures",

(56) References Cited

OTHER PUBLICATIONS

Sustainability 2022, 14, 10984. https://doi.org/10.3390/su141710984.

Liu, Xinwei, et al., "Evaluation of Satellite Clock and Ephemeris Error Bounding Predictability for Integrity Applications", Proceedings of the 35th International Technical Meeting of the Satellite Division of The Institute of Navigation (ION GNSS+ 2022), Denver, Colorado, Sep. 2022, pp. 34-43.

Liu, Xinwei, et al., "Investigation into Satellite Clock and Ephemeris Errors Bounding Uncertainty and Predictability", Proceedings of the 2022 International Technical Meeting of The Institute of Navigation, Long Beach, California, Jan. 2022, pp. 252-272.

"An Introduction to GNSS, Chapter 4, GNSS Error Sources", https://novatel.com/an-introduction-to-gnss/chapter-4-gnsserror-sources, published 2015.

"Geo++ SSR For Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/Integrity, published 2011.

"Navstar GPS Space Segment/Navigation User Segment Interfaces", IS-GPS-200L, 228 pages (Year: 2020), May 14, 2020.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"RAIM", GMV, 2011, RAIM.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

"Wikipedia (Covariance matrix)", https://en.wikipedia.org/wiki/Covariance_matrix, downloaded May 2, 2023 (Year: 2023).

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.

Angelo, Joseph, et al., "System and Method for Detecting Outliers in GNSS Obervations", U.S. Appl. No. 18/116,117, filed Mar. 1, 2023.

Bijl, Hildo, et al., "Online sparse Gaussian process regression using FITC and PITC approximations", IFAG-Papers On Line vol. 48, Issue 28, 2015, pp. 703-708 (Year: 2015).

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Boda, Aaron, "Cycle Slip Detection using PVA Kalman Filter", Technical Report • Dec. 2017.

Brack, A., "Optimal Estimation of a Subset of Integers With Application to GNSS", Artificial Satellites, vol. 51, No. 4—2016 DOI: 10. 1515/arsa-2016-0011.

Brocard, Philippe, "Integrity monitoring for mobile users in urban environment", https://tel. archives-ouvertes.fr/tel-01379632/document, submitted Oct. 11, 2016.

Brocard, Philippe, et al., "System and Method for Distributed Integrity Monitoring", U.S. Appl. No. 18/491,167, filed Oct. 20, 2023.

Bruno, Jon, et al., "A realistic simulation framework to evaluate ionospheric tomography", Advances in Space Research 65 (2020) 891-901.

Cassel, Ryan, "Real-Time ARAIM Using GPS, Glonass, and Galileo", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thornton UD Filtering for Double-Differenced Carrier Phase Estimation Accounting for Full Mathematical Correlation", Jan. 2008, ION NTM 2008, pp. 756-762., 2017-06-23 00:00:00.0.

Cole, D.A., et al., "Locally induced Gaussian processes for large-scale simulation experiments", Stat Comput 31, 33 (2021). https://doi.org/10.1007/s11222-021-10007-9 (Year: 2021).

Collin, Jussi, et al., "TKT-2546 Methods for Positioning", Tampere University of Technology, 2010, 50 pages.

Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.

Ding, Wei, et al., "Carrier Phase-Based Precise Heading and Pitch Estimation Using a Low-Cost GNSS Receiver", Remote Sens. 2021,13,3642. https://doi.org/ 10.3390/rs13183642.

Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.

Erickson, Collin B., et al., "Comparison of Gaussian Process Modeling Software", European Journal of Operational Research 266 (2018) 179-192 (Year: 2018).

Farrell, James L., "Carrier Phase Processing Without Integers", ION 57th Annual Meeting/CIGTF 20th Biennial Guidance Test Symposium, Jun. 11-13, 2001, Albuquerque, NM.

Favey, Etienne, et al., "Dead reckoning fills-in GPS navigation gap", EE Times, Automotive Designline, Aug. 18, 2011.

Feng, Shaun, et al., "Carrier phase-based integrity monitoring for high-accuracy positioning", GPS Solution, Apr. 2009.

Freda, Peirluigi, et al., "Time-differenced carrier phases technique for precise GNSS velocity estimation", GPS Solut, DOI 10.1007/s10291-014-0425-1, published online Dec. 31, 2014.

Gargiulo, Gianluca, et al., "GNSS Integrity and protection level computation for vehicular applications", Conference: Proceedings of 16th Ka and broadband communications—navigation and earth observation conference, Jan. 2010, https://www.researchgate.net publication/239949398_GNSS_Integrity_and_protection_level_computation_for_vehicular_applications.

Geng, Jianghui, et al., "Toward global instantaneous decimeter-level positioning using tightly coupled multi-constellation andmulti-frequency GNSS", Journal of Geodesy, vol. 92, p. 977-991 (Year: 2019).

Gratton, Livio, et al., "Carrier Phase Relative RAIM Algorithms and Protection Level Derivation", Journal of Navigation (2010), 63, 215-231, doi: 10.1017/S0373463309990403.

Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

Hirokawa, Dr. Rui, "Recent Activity of International Standardization for High-Accuracy GNSS Correction Service", Mitsubishi Electric, Jun. 27, 2019.

Huang, Panpan, "Airborne GNSS PPP Based Pseudolite System", School of Civil and Environmental Engineering Faculty of Engineering UNSW. Jun. 2019.

Ibrahim, Hassan E., et al., "A Regional Stochastic Model for NOAA-Based Residual Tropospheric Delay", ION NTM 2008, Jan. 28-30, 2008, San Diego, CA.

Inyurt, Samed, et al., "Ionospheric TEC Forecasting Using Gaussian Process Regression (GPR) and multiple Linear Regression (M LR) in X Turkey", Astrophys Space Sci (2020) 365:99, https://doi.org/10.1007 / s10509-020-03817-2 (Year: 2020).

Karaim, Malek, et al., "GNSS Error Sources", https://www.intechopen.com/books/multifunctional-operation-and-application-of-gps/gnss-error-sources, published Apr. 6, 2018.

Khanafseh, Samer, et al., "GNSS Multipath Error Modeling for Automotive Applications", Abstract only, Proceedings of the 31st International Technical Meeting of the Satellite Division of The

(56) References Cited

OTHER PUBLICATIONS

Institute of Navigation (ION GNSS+ 2018), Miami, Florida, Sep. 2018, pp. 1573-1589, https://www.ion.org/publications/abstract.cfm?articleID=16107.
Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.
Kim, Jungbeom, et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.
Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan, et al., "GP-UKF: Unscented kalman filters with Gaussian process prediction and observation models", Conference Paper, Dec. 2007, 10.1109/IROS.2007.4399284.
Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lim, Cheol-Soon, et al., "Feasibility Study on Integration of SSR Correction into Network RTK to Provide More Robust Service", JPNT 7(4), 295-305 (2018).
Lin, Ming, et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.
Madani, Kurosh, et al., "Studies in Computational Intelligence", Revised and Selected Papers of the International Joint Conference, IJCCI 2011, Paris, France, Oct. 24-26, 2011.
Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.
Maybeck, Peter S., "Stochastic models, estimation, and control", vol. 1, Academic Press, p. 1-16, 133-134, 169-176, 203-220, 275-276, 289-306, 341-362, 411-423 (Year: 1979).
Meng, Xiaoli, et al., "A Robust Vehicle Localization Approach Based on GNSS/IMU/DMI/LIDAR Sensor Fusion for Autonomous Vehicles", Sensors, 2017, 17, 2140.
Odijk, Dennis, et al., "On the estimability of parameters in undifferenced, uncombined GNSS network and PPP-RTK user models by means of S-system theory", Journal of Geodesy, Nov. 2015.
Ogaja, Clement A., "Applied GPS for Engineers and Project Managers", ASCE Press, p. 177-179 (Year: 2011).
Parkins, Alexander James, "Performance of precise marine positioning using future modernised global satellite positioning systems and a novel partial ambiguity resolution technique Department of Civil", Environmental and Geomatic Engineering, Aug. 2009.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World the Business and Technology of Global Navigation and Positioning, Apr. 1, 2008.
Petovello, Mark, "How does a GNSS receiver estimate velocity?", Inside GNSS, Mar./Apr. 2015, www.insidegnss.com.
Phelts, R. Eric, et al., "Innovation: Improving ARAIM, An approach using precise point positioning", GPS World, Jun. 13, 2020, https://www.gpsworld.com/innovation-improving-araim/.
Pongsakornsathien, Nichakorn, et al., "A Performance-Based Airspace Model for Unmanned Aircraft Systems Traffic Management", Aerospace, vol. 7(154), 26 pages (Year: 2020).
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Quinonero-Candel, Joaquin, et al., "A Unifying View of Sparse Approximate Gaussian Progress Regression", Journal of Machine Learning Research 6 (2005) 1939-1959. (Year: 2005).
Rasmussen, C.E., et al., "Gaussian Processes for Machine Learning", MIT Press, 2006, ISBN 026218253X. c 2006 Massachusetts Institute of Technology, (Year: 2006).
Reimer, Christian, et al., "System and Method for Fusing Sensor and Satellite Measurements for Positioning Determination", U.S. Appl. No. 18/115,963, filed Mar. 1, 2023.
Richardson, Julian, "Flexible Generation of Kalman Filter Code", NASA Technical Reports Server (NTRS), Document ID 20060019115, Jan. 1, 2006.
Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.
Rothacher, M., et al., "ANTEX: The Antenna Exchange Format, Version 1.4", Sep. 15, 2010, IGC International GNSS Service, https://kb.igs.org/hc/en-US/articles/216104678-ANTEX-format-description.
Satirapod, Chalermchon, "Improving the GPS Data Processing Algorithm for Precise Static Relative Positioning", School of Surveying and Spatial Information Systems The University of New South Wales. Jan. 2002.
Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.
Schmid, Ralf, et al., "From Relative Absolute Antenna Phase Center Corrections", Conference: IGS Workshop and Symposium 2004.
Schmid, Ralf, "How to Use IGS Antenna Phase Center Corrections", GPS World Tech Talk, Feb. 3, 2010.
Schmitz, Martin, "RTCM State Space Representation Messages, Status and Plans", PPP-RTK & Open Standards Symposium, Mar. 12-13, 2012, Frankfurt, Germany.
Shapiro, Larry S., et al., "Rejecting Outliers and Estimating Errors in an Orthogonal-Regression Framework", Phil. Trans. R. Soc. Load. A (1995)350, 407-439. (Year: 1995).
Skog, Isaac, et al., "A Low-Cost GPS Aided Inertial Navigation System for Vehicle Applications", 2005 13th European Signal Processing Conference, Sep. 4-8, 2005.
Sleewaegen, Jean-Marie, et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.
Smolyakov, Ivan, et al., "System and Method for Determining GNSS Corrections", U.S. Appl. No. 18/241,542, filed Sep. 1, 2023.
Snelson, Edward, et al., "Sparse Gaussian Process using Pseudo-inputs", NIPS'05: Proceedings of the 18th International Conference on Neural Information Processing Systems, Dec. 2005, pp. 1257-1264.

(56) References Cited

OTHER PUBLICATIONS

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by Mems IMU/GPS integration for mobile environment RTK-GPS", Tokyo University of Marine Science and Technology, ION GNSS 2008, abstract submission.

Takasu, Tomojii, et al., "Kalman-Filter-Based Integer Ambiguity Resolution Strategy for Long-Baseline RTK with Ionosphere and Troposphere Estimation", Tokyo University of Marine Science and Technology, Japan, revised Oct. 3, 2010—11 pages.

Takenaka, et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.

Tanedo, Flip, "Notes on non-holonomic constraints", For P3318, Spring 2013, https://www.physics.uci.edu/~tanedo/files/teaching/P3318S13/Sec_05_nonholonomic.pdf.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation a Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Teunissen, P.J.G., "The least-squares ambiguity decorrelation adjustment: its performance on short GPS baselines and short observation spans", Journal of Geodesy, (1997) 71: 589-602, 14 pages.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Wang, Yuechen, et al., "Real-time integrity monitoring for a wide area precise positioning system", Satell Navig (2020) 1:24.

Waserman, Eyal, et al., "A Mixed Integer Least-Squares Formulation of the GNSS Snapshot Positioning Problem", https://github.com/eyalw711/snapshot-positioning, Jun. 2, 2021.

Watanabe, Yoko, et al., "Fault-tolerant final approach navigation for a fixed-wing UAV by using long-range stereo camera system", 2020 International Conference on Unmanned Aircraft Systems (ICUAS) Athens, Greece, Sep. 1-4, 2020.

Weiss, Berntrop K., et al., "GNSS Ambiguity Resolution by Adaptive Mixture Kalman Filter", TR2018-103, Jul. 13, 2018.

Wendel, J., et al., "Time-Differenced Carrier Phase Measurements for Tightly Coupled GPS/INS Integration", 0-7803-9454-2/06/$20.00/@2006 IEE, Jul. 5, 2006, 2006 IEEE/ION Position, Location, and Navigation Symposium, Date of Conference: Apr. 25-27, 2006.

Won, Dachee, et al., "Performance Improvement of Inertial Navigation System by Using Magnetometer with Vehicle Dynamic Constraints", Hindawi, vol. 2015, published 2015, Article ID 435062, https://doi.org/10.1155/2015/435062, https://www.hindawi.com/journals/js/2015/435062/.

Wubbena, Gerhard, et al., "PPP-RTK: Precise Point Positioning Using State-Space Representation in RTK Networks", Presented at the 18th International Technical Meeting, ION GNSS-05, Sep. 13-16, 2005, Long Beach, California.

Wubbena, Gerhard, et al., "RTK Networks based on Geo++ GNSMART—Concepts, Implementation, Results", ION GPS 2001, Sep. 11-14, 2001, Salt Lake City, UT.

Xiao, Guorui, "A computationally efficient approach for isolating satellite phase fractional cycle biases based on Kalman filter", 19th EGU General Assembly, EGU2017, proceedings for the conference held 23-28-Apr. 2017 in Vienna., p. 12495.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Yang, Y., et al., "L1 Backup Navigation for Dual Frequency GPS Receiver", Proceedings of the 16th International Technical Meeting of the Satellite Division of The Institute of Navigation (ION GPS/GNSS 2003), Portland, OR, Sep. 2003, pp. 1258-1263.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

\* cited by examiner

SYSTEM AND METHOD FOR DISTRIBUTED INTEGRITY MONITORING

CROSS-REFERENCE TO RELATED APPLICATIONS

This application claims the benefit of U.S. Provisional Application No. 63/418,354 filed 21 Oct. 2022, which is incorporated in its entirety by this reference.

TECHNICAL FIELD

This invention relates generally to the GNSS positioning field, and more specifically to a new and useful system and method in the GNSS positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
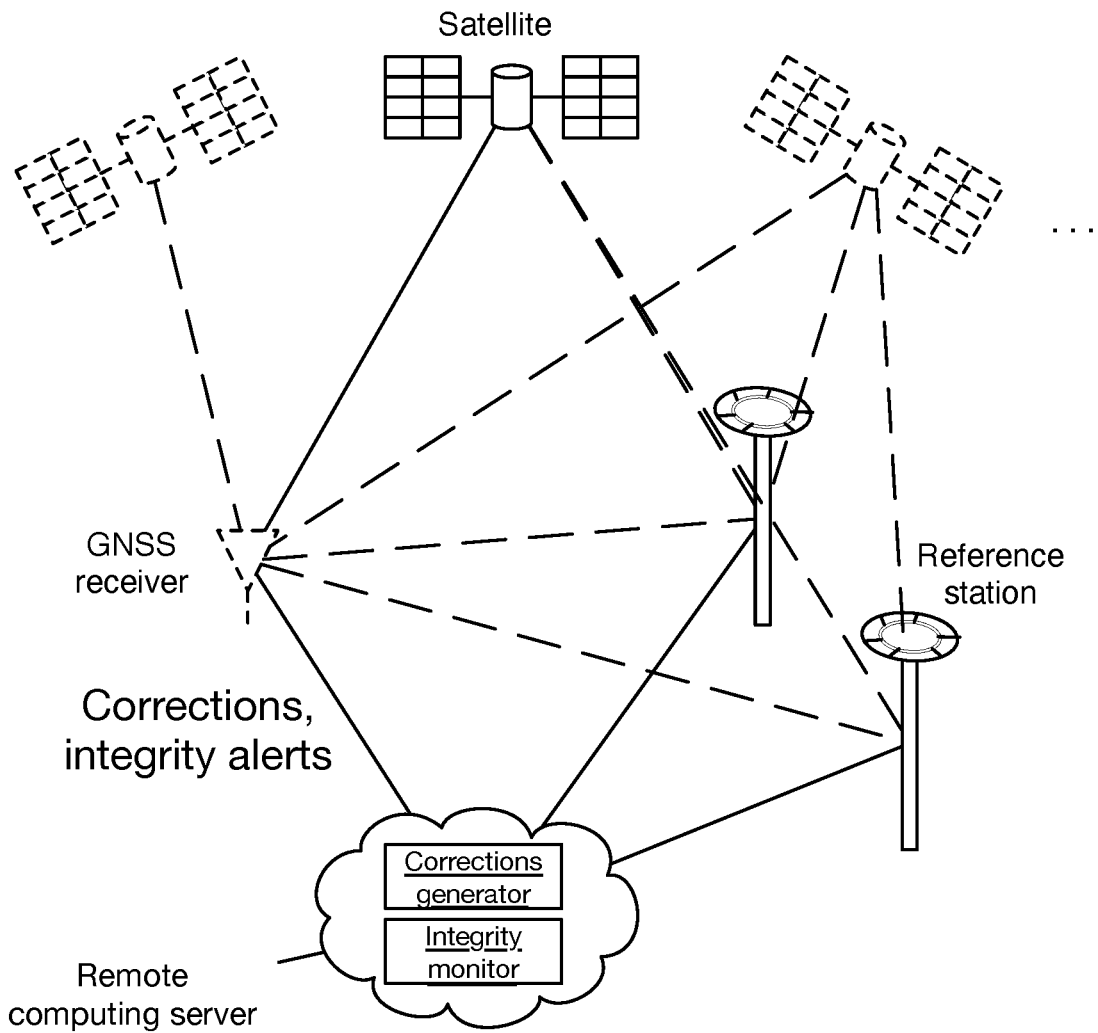
FIG. 1 is a schematic representation of an example of the apparatus.

As shown in FIG. 1, the system can include one or more data sources (e.g., satellites, reference stations, etc.), a computing system (e.g., a corrections generator thereof, a positioning engine thereof, a corrections monitor thereof, etc.), and optionally a GNSS receiver.

Figure 2:
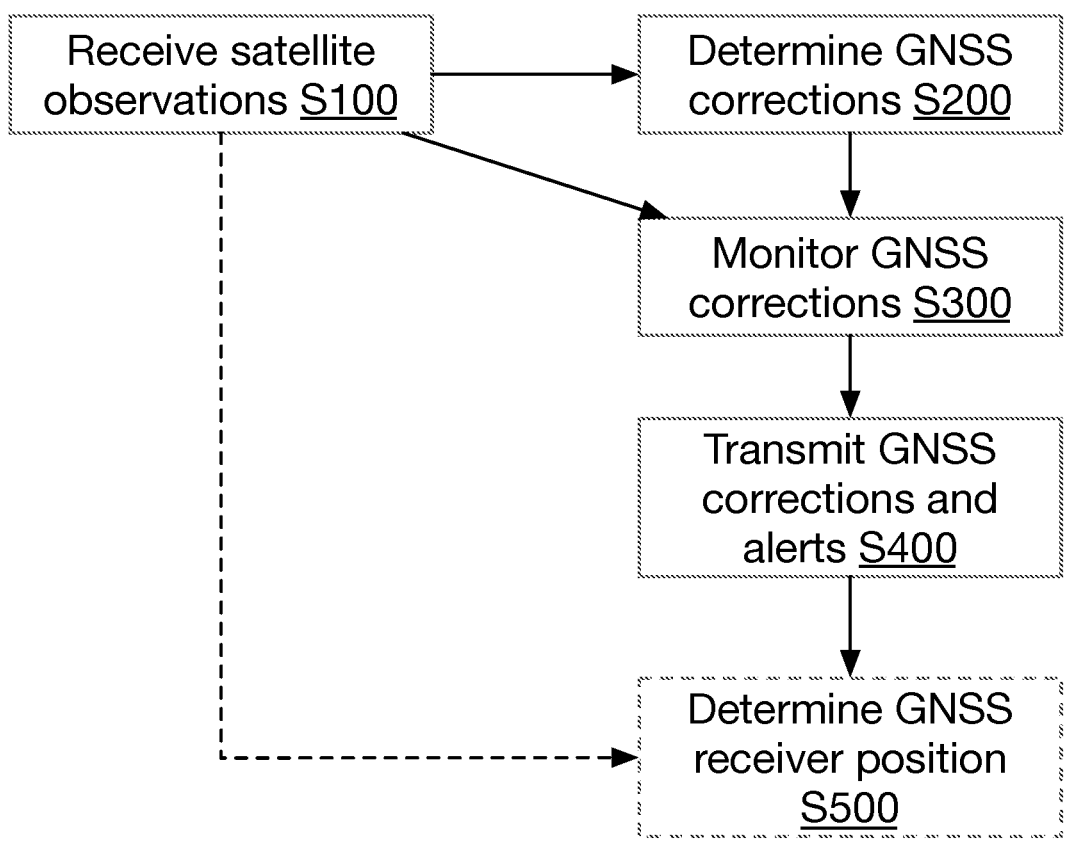
FIG. 2 is a schematic representation of an example of the method.

As shown in FIG. 2, the method can include receiving satellite observations S100, determining GNSS corrections S200, monitoring the GNSS corrections S300, transmitting the GNSS corrections and monitor result S400, determining a GNSS receiver positioning solution S500, and/or any suitable steps.

The system and method preferably function to determine (e.g., calculate, estimate, predict, etc.) and monitor (e.g., determine whether the information meets a threshold necessary for safety) GNSS corrections, which can enable determination of a receiver kinematic solution with a high accuracy (e.g., cm-level, dm-level, m-level, etc.), availability, integrity, and/or other property. However, the system and method can otherwise be used.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

First, the inventors have discovered that by distributing the responsibility for integrity between a GNSS receiver (e.g., user) and a corrections service, the user can, in some variants, ensure integrity of the GNSS corrections despite latency of the service and the potential interruption of service due to communication outages.

Second, the inventors have discovered that traditional time-to-alert requirements (e.g., as used in aviation, legacy GNSS augmentation systems, etc.) are likely to fail in other GNSS positioning applications such as autonomous vehicles (e.g., because a probability of losing a communication link is higher for an autonomous vehicle than in other traditional applications). As a result, the inventors have found that using the traditional approach to avoid missing an alarm (e.g., a system that repeats alerts or integrity flags for at least X seconds and when the communication link is not available for X seconds removing data until messages become available; where X can be 1, 2, 5, 10, 15, 20, 30, 45, 60, etc.) can lead to insufficient availability and/or cannot be guaranteed (e.g., because of data latency). Thus, the inventors have found that using an age of integrity approach and distributing the integrity monitoring can overcome these issues.

Third, variants of the invention can facilitate scalable and/or modular positioning solution integrity solutions. For instance, embodiments of the technology can transmit approximately the same amount of information as required to meet aviation time to alert standards; however, the information transmitted can allow the positioning engine to modularly determine how to (or even whether it should) determine an integrity of the positioning solution. For example, the use of an age of integrity can allow a protection level to be computed that scales with the age of integrity (e.g., scales linearly, exponentially, logarithmically, quadratically, superexponentially, according to a power law, etc.).

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. System

The system can use a set of data collected by one or more data sources. Data sources can include: receivers, sensors (e.g., located onboard the receiver, the external system, a reference station, etc.), databases, reference stations, satellites, and/or any other suitable data source. Examples of data that can be used include: satellite observations (e.g., received by a GNSS receiver, received by a reference station, etc.), sensor data, and/or any other suitable data.

The GNSS receiver preferably functions to measure a set of satellite observations (e.g., satellite signals) from one or more satellites. In variants, the GNSS receiver (e.g., a processor or measurement engine thereof) can determine the location (e.g., by using pseudorange, by using carrier phase) of the GNSS receiver (e.g., the receiver antenna, the external system, etc.) based on the satellite observations and/or sensor readings. The GNSS receiver can be in communication with a computing system, can include a computing system (e.g., a processor, a positioning engine, a fusion engine, etc.), can be integrated with the computing system, and/or the GNSS receiver and computing system can be arranged in any suitable manner. The GNSS receiver can be a stand-alone device (e.g., a stand-alone antenna or set of antennas), can be integrated into the rover (e.g., be a component of an automobile, aero vehicle, nautical vehicle, etc.), can be (e.g., be included in, be a component of, be a chip of, etc.) a user device (e.g., smart phone, laptop, cell phone, smart watch, etc.), and/or can be configured in any suitable manner.

The set of satellite observations can include orbital data, timestamp, range rate data, carrier phase data, pseudorange data, doppler data, and/or any suitable data. The set of satellite observations can be associated with metadata (e.g., ephemeris), and/or any suitable data. The set of satellite observations can include satellite observations corresponding to satellites from one or more satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). The set of satellite observations can additionally or alternatively include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one GNSS receiver (e.g., more than one antenna), each GNSS receiver can be the same or different, which can function to provide redundancy, provide information in the event of an outage to one of the antennas, provide validation and/or cross checks between data sources, and/or otherwise function. For example, different GNSS receivers can be configured to receive satellite observations associated one or more satellite constellations, one or more carrier frequencies (e.g., L1, L1C, L2, L3, L5, L6, E1, E5a, E5b, E5altboc, E5, E6, G1, G3, B1I, B1C, B2I, B2a, B3I, LEX, S band, etc. frequencies), and/or corresponding to any suitable data.

The reference stations (e.g., base stations) preferably function to receive satellite observations which can be used to correct satellite observations made at the GNSS receiver (e.g., mobile receiver), used to monitor the corrections, and/or can otherwise be used. The reference station satellite observations can be used to difference (e.g., form combinations with) the GNSS receiver observations, to model corrections (e.g., used by a corrections generator to generate a model of the GNSS corrections), and/or can otherwise be used. The reference stations are typically within a threshold distance of the GNSS receiver (e.g., within 10 km, 20 km, 50 km, 100 km, 150 km, 300 km, etc.), but can be further than the threshold distance from the GNSS receiver. The reference stations are preferably distributed such that for a given geographical region (e.g., city, county, province, state, country, continent, etc.) a GNSS receiver is within the threshold distance of at least one reference station. However, the reference stations can otherwise be distributed or arranged. The reference stations are preferably at substantially the same height relative to sea level (e.g., within about 100 m of the same height above sea level), but can have any suitable height(s) relative to each other and/or relative to the sea level.

The computing system preferably functions to process the data (e.g., satellite observations, reference station observations, sensor data, etc.) received by the GNSS receiver(s) and/or the reference station(s). The computing system can: determine GNSS corrections (e.g., based on the reference station satellite observations), filter the data (e.g., to calculate state vectors, ambiguities such as phase ambiguities, etc. associated with the data), calculate the GNSS receiver positioning solution (e.g., GNSS receiver location, velocity, attitude, etc.), calculate an integrity of the solution (e.g., the protection level, the integrity risk, etc.), calculate the external system (e.g., vehicle, rover, etc.) positioning solution, monitor the corrections, monitor the positioning solution, correct the data (e.g., correct the satellite observations for clock errors, hardware bias, atmospheric effects, etc.), and/or can process the data in any suitable manner. The computing system can be local (e.g., to the external system, to the GNSS receiver, to a reference station, etc.), remote (e.g., cloud computing, server, networked, etc.), and/or otherwise distributed (e.g., between a processor collocated with a GNSS receiver and a cloud computing system).

The computing system can include a corrections generator (e.g., configured to determine corrections, configured to convert corrections and/or satellite observations from a first frequency to a second frequency, etc.), a positioning engine (e.g., configured to determine a kinematic solution such as position, velocity, attitude, etc. for a GNSS receiver or associated external system), an integrity monitor (e.g., configured to monitor satellite observations for a potential feared event, configured to monitor corrections for a potential feared event, configured to issue an alert when a time limit has elapsed, configured to determine an integrity flag, etc.), and/or any suitable component(s). In some variants, the computing system can exclude an integrity monitor (e.g., because the corrections generator can perform the functions, operations, etc. of the integrity monitor).

The corrections generator is preferably implemented on a cloud computing server. However, the corrections generator can additionally or alternatively be implemented on a corrections station (e.g., a reference station configured to generate GNSS corrections for a local geographical region based on satellite observations in that region), on a processor collocated with the GNSS receiver (e.g., shared with a positioning engine), and/or on any suitable processor (e.g., distributed between two or more processors).

In a first specific example, a corrections generator can generate GNSS corrections by processing satellite observations for each reference station of a set of reference stations to determine (e.g., using a PPP filter) a local (e.g., near the reference station) satellite delay (e.g., atmospheric delay, ionosphere delay, troposphere delay, ionosphere gradient, total electron count, slant electron count, etc.), combining the local satellite delays to generate a nonlocal (e.g., global, nonspatially constrained, etc.) model of the satellite delay, and, optionally, generating tiled satellite delays and/or grid (or other distribution of points) satellite delays (e.g., tiled delays and/or grid delays as described in U.S. patent application Ser. No. 17/833,560 titled SYSTEM AND METHOD FOR DETERMINING GNSS POSITIONING CORRECTIONS' filed 6 Jun. 2022 which is incorporated in its entirety by this reference). In a second specific example, a corrections generation can generate GNSS corrections using a Gaussian model to process satellite observations from a set of reference station observations (e.g., in a manner as described in U.S. patent application Ser. No. 17/554,397 title 'SYSTEM AND METHOD FOR GAUSSIAN PROCESS ENHANCED GNSS CORRECTIONS GENERATION' filed 17 Dec. 2021, which is incorporated in its entirety by this reference). The covariance function of the Gaussian model can depend on the GNSS correction to be determined, a target accuracy of the GNSS correction(s), a target speed to generate the GNSS correction(s), and/or can depend on any suitable aspect. Examples of covariance functions include: constant functions, polynomial (e.g., linear, quadratic, piecewise smooth polynomials, etc.) functions, white noise functions, Kronecker delta (or Dirac delta function) functions, squared exponential functions, Ornstein-Uhlenbeck (e.g., Brownian) functions, (e.g., with variable drift terms that are dependent on the current value of the process), Weiner functions, Matérn functions, Bessel functions, periodic functions, rational (e.g., rational quadratic) functions, γ-exponential functions, neural network covariance functions, and/or any suitable covariance function. However, any covariance function can be used.

In some variations of the preceding examples, the corrections generator can receive satellite information (e.g., satellite clock delay, satellite orbit drift, satellite hardware bias, satellite carrier bias, antenna phase center, etc.) that can be combined with and/or used to facilitate calculation of the GNSS corrections of the preceeding examples. However, the GNSS corrections can be determined in any manner.

The integrity monitor (e.g., integrity chain, integrity checker, GNSS corrections checker, GNSS corrections monitor, etc.) is preferably implemented on a cloud computing server (e.g., on the same processor as the corrections generator, using the same cloud computing service as the corrections generator, using a separate and distinct processor from the corrections generator, etc.). Variations that use a different processor from the corrections generator can provide a technical advantage of mitigating a risk of a common processor error infecting the corrections checker and the corrections generator. However, the integrity monitor can be implemented on a monitoring station (e.g., a reference station where satellite observations at the monitoring station are used for monitoring the GNSS corrections, a reference station whose satellite observations are not used for generating the GNSS corrections, etc.), on a processor collocated with the GNSS receiver (e.g., a local processor), and/or can be implemented in any suitable processing environment.

Inputs to the integrity monitor can include the GNSS corrections (e.g., current GNSS corrections, GNSS corrections within a validity time window, etc. as determined by the corrections generator), a set of satellite observations (e.g., compensated satellite observations such as compensated for one or more effects such as as receiver to reference time scale clock offset, receiver differential code biases, etc.; the same set of satellite observations as used to generate the GNSS corrections; a distinct set of satellite observations from those used to generate the GNSS corrections; etc.), almanac data (e.g., weather information, solar activity, satellite positions, etc.), and/or any suitable information.

Outputs from the integrity monitor can include an integrity flag (e.g., an alert; an indication of whether the GNSS corrections are safe to use; an indication of whether the GNSS corrections are valid; an indication of an integrity, a total integrity risk, protection level, etc. that can be achieved for a positioning solution leveraging the GNSS correction; etc.), residual information (e.g., residuals remaining after correction satellite observations), GNSS corrections (e.g., GNSS corrections that are safe to use), and/or any suitable information.

An integrity monitor can function, for example, by computing residuals that remain after applying the GNSS corrections to a set of satellite observations (e.g., compensated satellite observations) and comparing the residuals to an integrity bound (e.g., generate a not OK flag when the residuals meet or exceed the integrity bound, generate an OK flag when the residuals are less than the integrity bound, etc.). The integrity bound can be a fixed value and/or can vary (e.g., depending on the number of satellites represented in the set of satellite observations, depending on the satellite frequencies of satellites represented in the set of satellite observations, depending on the number of satellite constellations represented in the set of satellite observations, depending on the number of satellites for each satellite constellation represented in the set of satellite observations, depending on a probability of missing detection of a feared event, depending on a probability of issuing a false alarm, depending on a target integrity risk, depending on an application, depending on whether an integrity is needed, etc.). In some variations, the integrity monitor can track changes in the residuals over time (e.g., residual drift), which can be particularly (but not exclusively) beneficial for monitoring an integrity of a velocity (or other higher derivative of position with respect to time or absement) of the positioning solution. However, the integrity monitor can otherwise function.

Figure 3A:
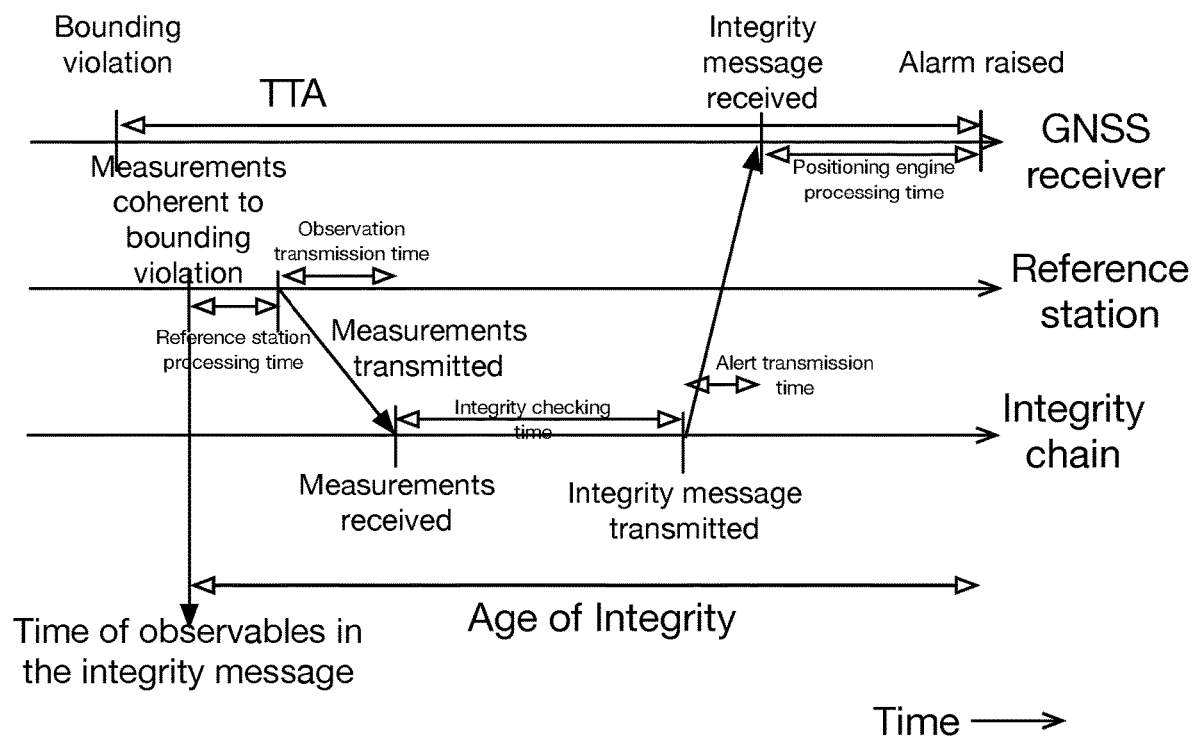
FIGS. 3A-3D are schematic representations an exemplary timelines of information received at or transmitted between different endpoints.
Figure 3B:
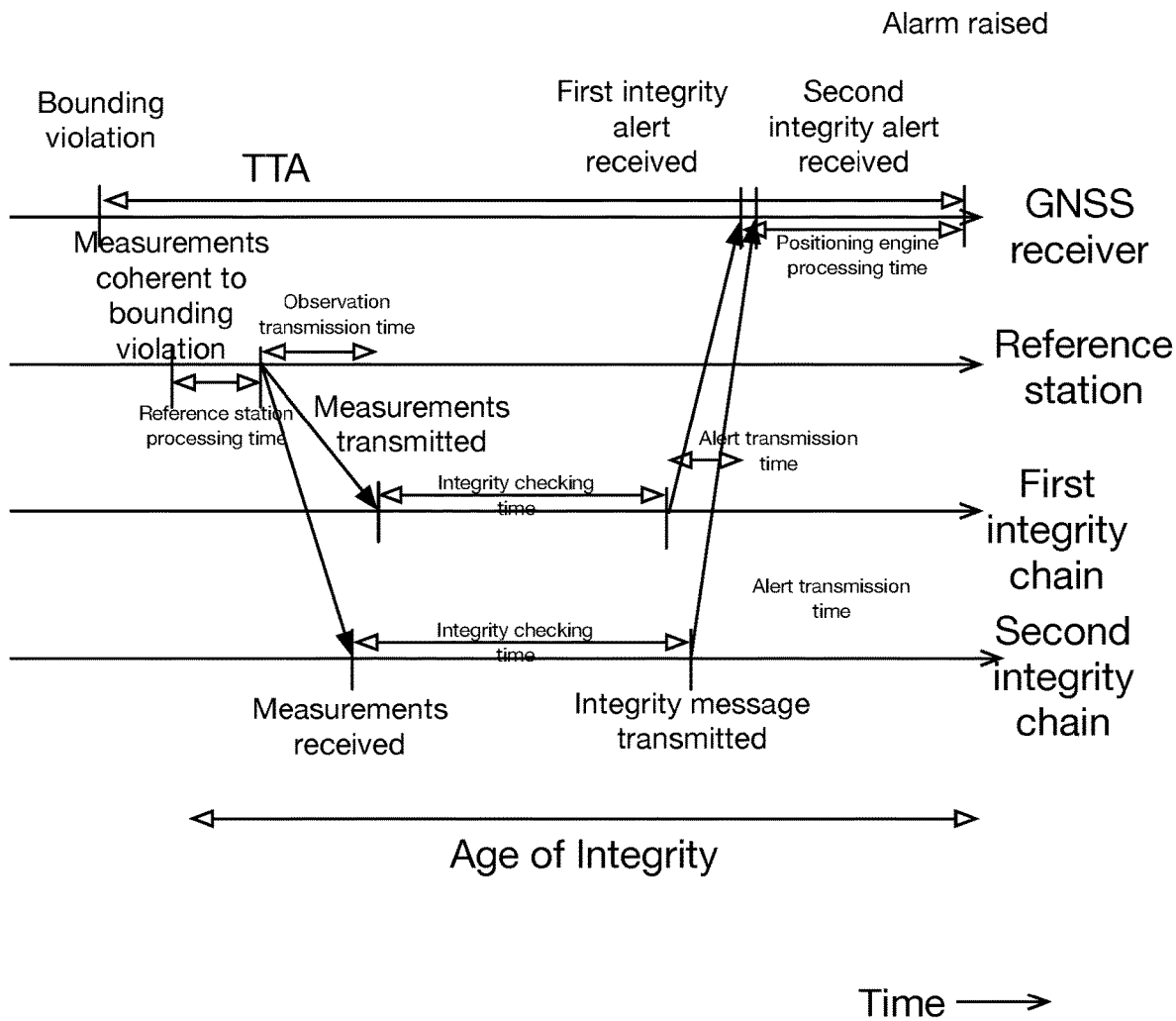

In some variants (as shown for example in FIG. 3B, FIG. 3C, or FIG. 3D), a plurality of corrections monitors (e.g., a first integrity chain, a second integrity chain, and so on) can be used (e.g., to provide redundancy, to capture processor errors, etc.), where each of the corrections monitors can generate an independent integrity flag that can be processed by (e.g., combined at) the positioning engine. The plurality of correction monitors can be implemented on the same or different processors. Each correction monitor of the set of corrections monitor preferably uses a distinct set of satellite observations. However, two or more corrections monitors can use the same set of satellite observations.

Figure 3C:
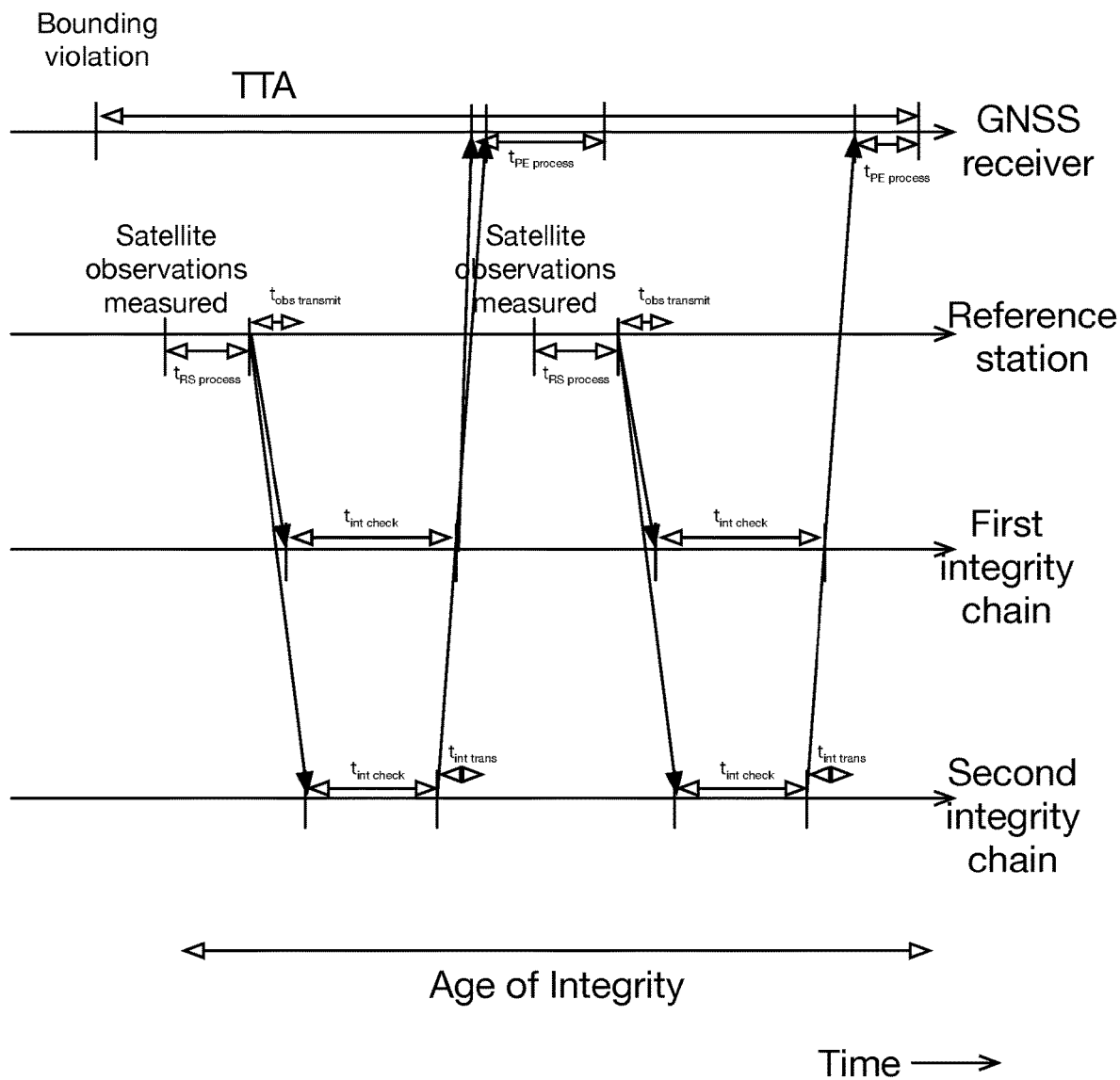
Figure 3D:
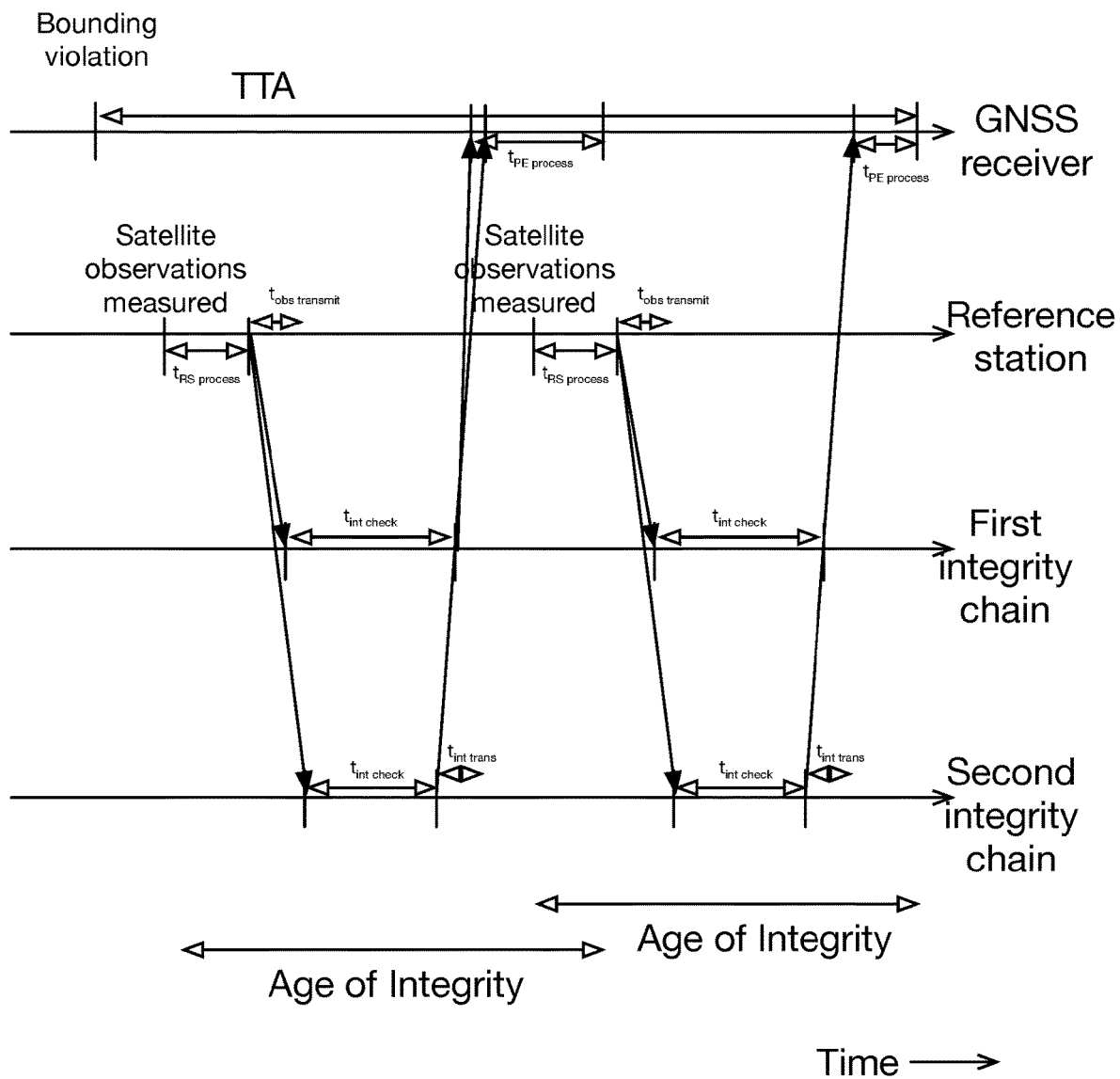
Figure 4:
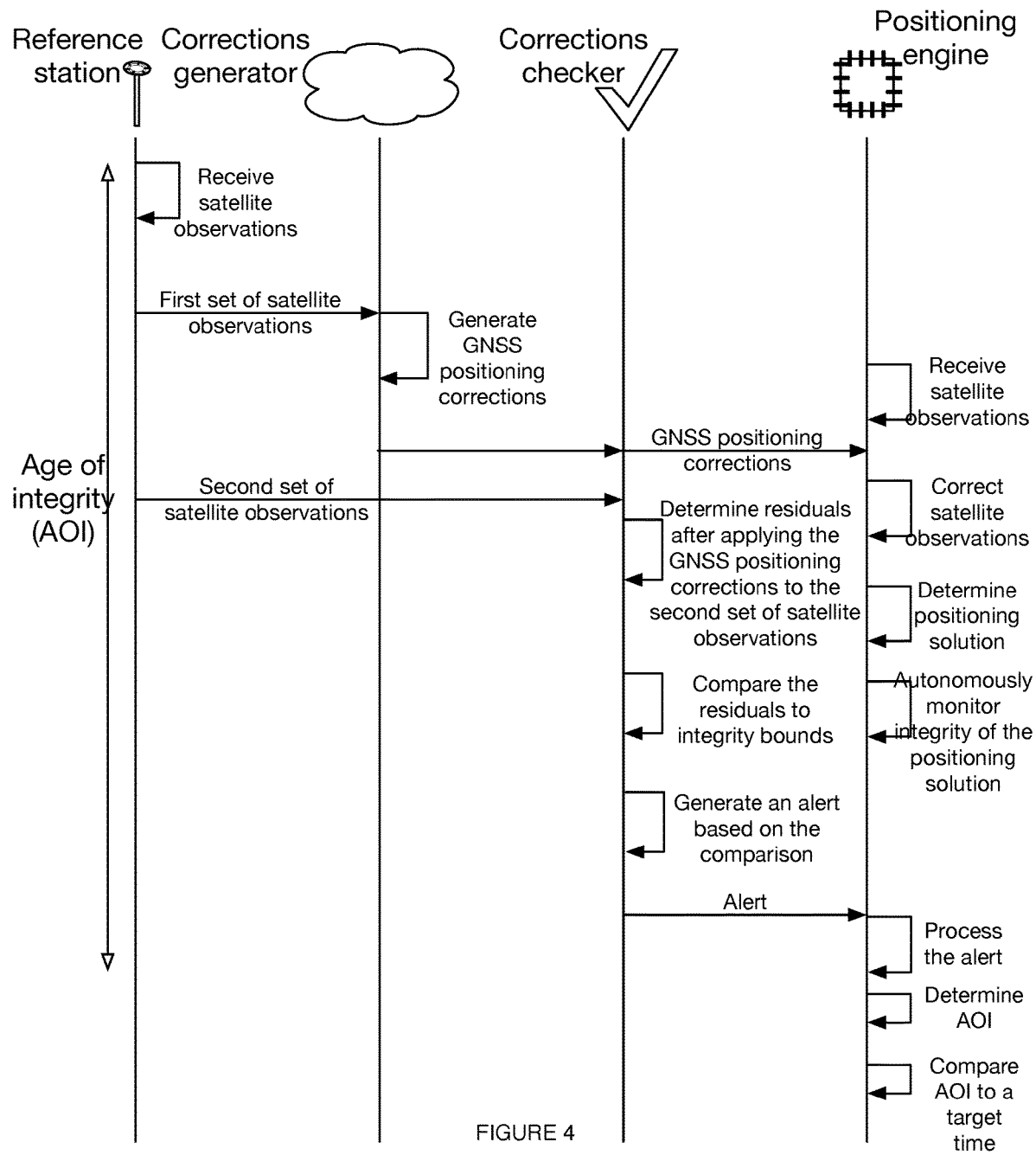
FIG. 4 is a process flow diagram of an example of the method.

In some variants that include a plurality of integrity monitors, an age of integrity can only be determined when a complete set of integrity monitor integrity flags (also referred to as integrity flags, alerts particularly when one or more GNSS correction is not okay to use, etc. such as 'OK' such as no bounding violation within a threshold was detected, 'NOK' i.e. not okay such as when one or more bounding violation relative to the threshold is detected, valid, invalid, etc.) is received (e.g., by a positioning engine, as shown for example in FIG. 3C, etc.). For instance, when an integrity monitor using given epoch of satellite observations from reference stations does not provide an integrity flag, the age of integrity can be extended back to a preceding epoch where all integrity monitors provided an integrity flag. In other variants (particularly but not exclusively, when in preceding epochs full integrity monitor information is available, when a bounding violation is observed within a threshold number of preceding epochs, when a received integrity flag from an integrity monitor indicates a bounding violation such as a residual exceeding a bounding threshold, when a higher accuracy integrity monitor provides an integrity flag, etc.), the age of integrity can be determined based on the monitored reference observations (e.g., based on the integrity monitor alerts that are received by the positioning engine, as shown for example in FIG. 3D, etc.). However, the age of integrity can be determined in any suitable manner in variants that use a plurality of integrity monitors.

The positioning engine can function to determine the positioning solution of the GNSS receiver and/or external system, monitor the integrity of the positioning solution (e.g., during the age of integrity time period where explicit corrections integrity information is not available), and/or can otherwise function. The positioning engine is typically implemented on a processor collocated with the GNSS receiver. However, the positioning engine can be implemented on a remote processor (e.g., in a cloud computing environment) and/or using any suitable processor(s) (e.g., distributed between a local processor and a remote processor).

In a specific example, the positioning engine can estimate the positioning solution for the current time from a positioning solution in the past (e.g., by propagating from a positioning solution estimated at the current time minus the age of integrity that was safe such as using dead reckoning as disclosed in U.S. patent application Ser. No. 18/073,304 titled 'SYSTEM AND METHOD FOR FUSING DEAD RECKONING AND GNSS DATA STREAMS' filed 1 Dec. 2022 which is incorporated in its entirety by this reference). During that period (e.g., the period of time between the current time and the age of integrity that was safe, while the positioning engine is estimating the positioning solution, etc.), the positioning engine has to monitor its integrity on its own for that exposure time of age of integrity. However, the positioning engine can otherwise estimate the positioning solution at the current time and/or during the age of integrity.

The positioning engine preferably leverages the integer nature of the carrier phase ambiguities to improve the positioning solution. However, the positioning engine can additionally or alternatively use pseudorange, doppler, and/or any suitable measurements to determine the positioning solution. For example, the positioning engine can determine floating-point valued carrier phase ambiguities (e.g., for satellite carrier phases that have been corrected using the GNSS corrections, for combinations of satellite observations, for uncorrected satellite observations, etc.), constrain the floating-point valued carrier phase ambiguities to integer valued carrier phase ambiguities (e.g., by generating a set of integer valued carrier phase ambiguities and performing hypothesis testing to select the integer valued carrier phase ambiguity from the set of integer valued carrier phase ambiguity), and then determining the positioning solution based on the integer-valued carrier phase ambiguities. However, the positioning engine can otherwise function.

In a specific example, the positioning engine can determine (e.g., estimate) an integrity (e.g., a protection level, horizontal protection level, vertical protection level, protection level in a direction of travel, protection level orthogonal to a direction of travel, etc.) of the positioning solution by iteratively evaluating, for a plurality of target integrity risks, a relationship between each target integrity risk and a number of feared events, an impact of each feared event, a probability of the feared event occurring, and a probability of missed detection of the feared event. In this specific example, the plurality of target integrity risks can depend on the age of integrity (e.g., each integrity risk of the plurality can be chosen based on the age of integrity, a bounding integrity risk of the plurality can be set based on the age of integrity, etc. such as the most recent age of integrity, potential values of the age of integrity given the time since a previous age of integrity was determined, etc.), the list of feared events, an application of the external system, a necessary integrity risk to ensure safe operation, and/or based on any suitable information. Variations of this specific example can leverage sensor measurements (e.g., inertial measurement unit (IMU), inertial and magnetic measurement unit (IMMU), wheel tick, etc. sensors). In a second specific example (that can be used in combination or isolation of the preceding example), the positioning engine can determine the integrity of the positioning solution in a manner as disclosed in U.S. patent application Ser. No. 18/217,954 titled 'SYSTEM AND METHOD FOR COMPUTING POSITIONING PROTECTION LEVELS' filed 3 Jul. 2023 which is incorporated in its entirety by this reference. In a third specific example (particularly when the age of integrity exceeds a threshold time such as a time to alert, but potentially also when an age of integrity is not available or in other situations), the positioning engine can not determine an integrity of the positioning solution (e.g., cannot treat the positioning solution as having suitable safety but can use the results as an approximate position). In this example, the threshold time could be 4 s, 6 s, 7 s, 8 s, 9 s, 10 S, 12 S, 15 S, 20 s, 30 s, 60 s, 120 s, 300 s, values or ranges therebetween, >300 s, and/or any suitable time (e.g., as selected, determined, set, etc. by a GNSS receiver or external system operator, user, In some variations of these specific example, the integrity risk can be variable (e.g., depend on the age of integrity). For instance, for a fixed protection level (such as 1 m, 2 m, 5 m, 10 m, etc.), the integrity risk can be varied to determine the integrity risk that the fixed protection level can be achieved. However, the integrity of the positioning solution in any manner.

When a plurality of integrity flags are generated (e.g., from a plurality of corrections monitors, from a corrections generator and a corrections monitor, etc.), the positioning engine preferably combines the integrity flags, where the combined integrity flags is used to determine the age of integrity. For example, the integrity flags can be combined using logic functions such as an OR function where when either integrity flag indicates the GNSS corrections are not okay the positioning engine could use a previous epoch of measurements (when the GNSS corrections were indicated to be okay) to determine an age of integrity, the positioning engine could proceed indicating that the positioning solution may not achieve a target integrity, and/or the positioning engine can otherwise operate.

4. Method

The method preferably functions to determine GNSS corrections. The GNSS corrections are preferably used to determine high-accuracy (e.g., with an accuracy of 1 mm, 5 mm, 1 cm, 2 cm, 5 cm, 10 cm, 20 cm, 50 cm, 1 m, 2 m, values or ranges therebetween, etc.) and/or high-integrity (e.g., with a total integrity risk less than $10^{-4}$/hr, $10^{-5}$/hr, $10^{-6}$/hr, $10^{-7}$/hr, $10^{-8}$/hr, $10^{-9}$/hr, etc.) GNSS receiver positioning solutions (e.g., kinematic solutions; such as position, velocity, attitude, acceleration, etc.). However, the GNSS corrections can otherwise be used and/or the method can otherwise function.

The method (and/or steps thereof) can be performed in real or near-real time (e.g., with satellite observation receipt, with external system and/or GNSS receiver operation, etc.), delayed (e.g., the corrections can be predetermined for future GNSS positioning solution determination), and/or can be performed with any suitable timing. The method (and/or steps thereof) can be performed once, repeatedly, iteratively, in response to a trigger (e.g., receipt of satellite observations, request from an operator, etc.), and/or with any suitable frequency and/or timing.

Receiving the satellite observations S100 functions to measure and/or detect a set of satellite signals, where each satellite signal is associated with a satellite. The satellite observations can be received at a reference station, a GNSS receiver, a computing system (e.g., where satellite observations can be stored and/or retrieved from a database), and/or at any suitable endpoint. In an illustrative example, satellite signals associated with (e.g., from) a first set of satellites are received by a GNSS receiver and satellite signals associated with (e.g., from) a second set of satellites are received by a set (of one or more) reference stations. The first and the second set of satellites can be the same, the first set of satellites can be a strict subset of the second set of satellites, the second set of satellites can be a strict subset of the first set of satellites, the first set of satellites can include one or more satellites that are in second set of satellites and one or more satellites that are not in the second set of satellites, and/or the first and second set of satellites can include any suitable satellites and/or relationships between satellites. In a second illustrative example, a first set of satellite observations can be measured by (e.g., tracked by) a first set of reference stations and a second set of satellite observations can be measured by (e.g., tracked by) a second set of reference stations. In the second illustrative example, the first and second sets of satellite observations can include observations from the same satellites, the first set of satellite observations can be a superset of the second set of satellite observations (or vice versa), the first set of satellite observations and the second set of satellite observations can be disjoint (e.g., include satellite observations from no share satellites), and/or the first and second set of satellite observations can otherwise be related (e.g., include a subset of satellite observations associated with shared satellites and a subset of satellite observations from nonshared satellites). Similarly, the first and second sets of reference stations can include the reference stations, the first set of reference stations can be a superset of the second set of reference stations (or vice versa), the first set of reference stations and the second set of reference stations can be disjoint (e.g., include no share reference stations), and/or the first and second set of reference stations can otherwise be related (e.g., include a subset of shared reference stations and a subset of nonshared reference stations). Typically in the second illustrative example, the first and second sets of satellite observations will be from different epochs. However, the first and second sets of satellite observations can be from the same epoch.

S100 can include receiving a plurality of sets of satellite observations, where each set of satellite observations can be used in a different manner. Typically, each set of satellite observations of the plurality is associated with a different epoch. However, two or more sets of the plurality can be associated with the same epoch. Each set of satellite observations of the plurality of sets can be received by the same and/or different receivers (e.g., GNSS receivers, reference station, etc.).

In a specific example, a first set of satellite observations (e.g., a corrections set of satellite observations) can be used to determine satellite corrections (e.g., in S200), a second set of satellite observations (e.g., a monitor set of satellite observations) can be used to monitor the satellite corrections for potential predetermined events (also referred to as feared events e.g., in S300), and a third set of satellite observations (e.g., positioning satellite observations) can be used to determine a GNSS receiver position (e.g., in S500). In variants of this example, the first and second set of satellite observations can be measured at one or more reference stations (e.g., the same reference stations, different reference stations, etc.) and the third set of satellite observations can be measured at a GNSS receiver. In variants of this specific example, the first, second, and third sets of satellite observations can be associated with different epochs. However, any suitable satellite observations can be measured.

S100 preferably includes monitoring the received satellite observations for one or more predetermined events. The received satellite observations are preferably monitored locally (e.g., satellite observations received at a reference station are monitored at the reference station, satellite observations received at a GNSS receiver are monitored at the GNSS receiver, etc.). However, the received satellite observations can be monitored remotely (e.g., at a cloud computing server, at a monitoring station, etc.). The predetermined events are preferably determined substantially instantaneously (e.g., before the observations are transmitted to an endpoint, within less than about 0.5 s, etc.). However, the predetermined events can be determined within a threshold amount of time (e.g., where the threshold time to detection can be accounted for in a potential time and/or integrity budget) and/or with any suitable timing.

As an illustrative example, the received satellite observations can be monitored for predetermined events (e.g., outliers, cycle slips, code incoherence, carrier phase incoherence, orbit faults, clock faults, satellite hardware bias, GNSS receiver hardware bias, etc.) as described in U.S. patent application Ser. No. 18/116,117 titled 'SYSTEM AND METHOD FOR DETECTING OUTLIERS IN GNSS OBSERVATIONS' filed 1 Mar. 2023, U.S. patent application Ser. No. 16/748,517 titled 'SYSTEMS AND METHODS FOR REDUCED-OUTLIER SATELLITE POSITIONING' filed 21 Jan. 2020 and/or U.S. patent application Ser. No. 17/829,019 titled 'SYSTEMS AND METHODS FOR HIGH-INTEGRITY SATELLITE POSITIONING' filed 31 May 2022, each of which is incorporated in its entirety by this reference. However, the received satellite observations can be monitored in any manner.

Determining GNSS corrections S200 functions to determine (e.g., calculate, estimate, generate, etc.) GNSS corrections that can be used by a GNSS receiver in determining a GNSS receiver positioning solution. The GNSS corrections are preferably determined by a corrections generator (e.g., operating on a cloud computing server, operating on a processor collocated with a GNSS receiver, operating on an external system processor, etc.). However, the GNSS corrections can be determined using any suitable component. The GNSS corrections are preferably determined using a set of reference station observations (e.g., a set of one or more satellite signals received by one or more reference stations). However, the GNSS corrections can additionally or alternatively be determined using prior GNSS corrections, rover observations, sensor data, and/or any suitable data or information.

The GNSS corrections can include bias corrections (e.g., phase bias corrections, code bias corrections, true bias corrections, etc.), clock corrections, orbit corrections, atmospheric delay (e.g., ionospheric delay, tropospheric delay, etc.), antenna phase center, solid earth tides, solid earth pole tides, ocean tidal loading, and/or any suitable corrections.

The GNSS corrections are preferably state space representation (SSR) corrections (e.g., where different error terms are modeled and distributed separately). However, the GNSS corrections can additionally or alternatively be observation state representation (OSR) corrections (e.g., where error terms are lumped together as an observation such as for a virtual reference station, OSR corrections derived from SSR corrections such as disclosed in U.S. patent application Ser. No. 18/079,640 titled 'SYSTEM AND METHOD FOR CORRECTION SATELLITE OBSERVATIONS' filed 12 Dec. 2022 which is incorporated in its entirety by this reference, etc.) and/or any suitable corrections.

The GNSS corrections can be determined using a Kalman filter, a Gaussian process, a particle filter, and/or using any suitable estimator. For example, the GNSS corrections can be determined in a manner as disclosed in Ser. No. 17/554,397 titled 'SYSTEM AND METHOD FOR GAUSSIAN PROCESS ENHANCED GNSS CORRECTIONS GENERATION' filed 17 Dec. 2021 and/or U.S. patent application Ser. No. 17/347,874 titled 'SYSTEMS AND METHODS FOR DISTRIBUTED DENSE NETWORK PROCESSING OF SATELLITE POSITIONING DATA' filed 15 Jun. 2021, each of which is incorporated in its entirety by this reference. However, the GNSS corrections can be determined in any manner.

Monitoring the corrections S300 functions to verify the reliability of corrections (e.g., integrity of the corrections) such as corrections determined in S200. S300 is preferably performed by an integrity monitor (e.g., operating on a cloud computing server, operating a monitoring station, operating on a computing system collocated with a GNSS receiver, etc.), but can be performed by any suitable component (e.g., by a corrections generator).

S300 preferably monitors current GNSS corrections (e.g., most recently generated GNSS corrections) as well as previous GNSS corrections (e.g., previous valid GNSS corrections). For example, all GNSS corrections generated within a validity time window can be monitored. Monitoring both current and previous GNSS corrections can provide a technical advantage of identifying abnormal behavior (e.g., by when an error is greater than a threshold, the flag is set to NOT OK for that element) in an element (e.g., a satellite) that can invalidate previous corrections. However, S300 can monitor only current GNSS corrections (which may facilitate or enable filtering, separating, isolating, etc. safe to use GNSS corrections from not safe GNSS corrections such as by altering a GNSS corrections message to only include safe GNSS corrections) and/or can monitor any suitable GNSS corrections.

The corrections are preferably monitored using a set of independent satellite observations (e.g., the monitoring satellite observations are preferably independent of the corrections satellite observations). For example, the monitoring satellite observations can be received at a different set of reference stations than the corrections satellite observations, the monitoring satellite observations can be received during a different epoch than the corrections satellite observations, the monitoring observations can have a different frequency than the corrections frequency (e.g., where the corrections frequency and/or monitoring frequency can be converted to one another in a manner such as disclosed in U.S. patent application Ser. No. 18/241,542 titled 'SYSTEM AND METHOD FOR DETERMINING GNSS CORRECTIONS' filed 1 Sep. 2023 which is incorporated in its entirety by this reference), the monitoring observations can be associated with different satellites and/or satellite constellations from the generating satellite observations, and/or the monitoring satellite observations can otherwise be independent of the satellite observations. However, additionally or alternatively the corrections can be monitored using interdependent satellite observations (e.g., the monitoring satellite observations and the corrections satellite observations can include common satellite observations), the set of corrections satellite observations can include one or more satellite observation that is used to monitor the corrections (e.g., and not used to determine the corrections), and/or the corrections can be monitored using any suitable satellite observations and/or other data.

S300 can include determining residual values from applying the corrections to the monitoring satellite observations and comparing the residuals (and/or other corrected reliability reference station observations) to one or more thresholds. The thresholds can be associated with an integrity bound (e.g., when the residuals meet the threshold the corrections can enable a high accuracy estimated position, integer-valued carrier phase ambiguity determination, intermediate data generation, etc.), a confidence that an integrity bound can be achieved (e.g., a confidence that the corrections can enable a high accuracy estimated position, integer-valued carrier phase ambiguity determination, intermediate data generation, etc.), and/or any suitable results.

When the residual is less than or equal to the threshold, the corrections can be transmitted to and/or used by the positioning engine (e.g., reliability of the corrections can indicate that the corrections are safe to use, will generate an estimated position and/or velocity with a target integrity, an 'ok' integrity flag can be generated, etc.). When the residual is greater than the threshold, S300 can include: generating an integrity flag (e.g., flag, alert, 'NOK,' etc.) indicating that the corrections should not be used (e.g., a not 'ok' alert), generate an integrity flag indicating using the corrections will likely produce an estimate of the position with an integrity or accuracy exceeding a target integrity or accuracy, generate an integrity flag indicating an integrity with which the positioning solution can be generated by using the GNSS corrections, and/or any suitable integrity flags can be generated and/or can be used in any suitable manner (e.g., not be transmitted to the positioning engine). The integrity flags (e.g., flag) can be associated with a validity set of corrections, individual corrections data, subsets of validity set of corrections, and/or any suitable corrections.

In some variants, S300 can include monitoring a change in the residuals over time (e.g., to detect drift that may affect velocity estimation). When the change in the residuals over time is greater than the threshold, an integrity flags (e.g., flag) can be generated indicating that the corrections should not be used (e.g., for velocity estimation), an integrity flag can be generated indicating an estimated accuracy and/or integrity for a positioning solution generated using the corrections, and/or any suitable integrity flags can be generated and/or the corrections can be used in any manner (e.g., not be transmitted).

S300 can include generating an integrity message that includes an integrity flag (e.g., generated in S300) and a timestamp (e.g., the timestamp associated with receipt of the set of satellite observations used to monitor the GNSS corrections). The integrity message is preferably independent of a corrections message (e.g., a message that includes the GNSS corrections; optionally a timestamp such as associated with receipt of the set of satellite observations used to generate the GNSS corrections, a validity time of the GNSS corrections, etc.; a corrections message as described in U.S. patent application Ser. No. 18/244,567 titled 'SYSTEM AND METHOD FOR GNSS CORRECTION TRANSMISSION' filed 11 Sep. 2023 which is incorporated in its entirety by this reference; etc.). For instance, the integrity message and the corrections message can be two separate messages. However, the integrity message and the corrections message can be combined into the same message and/or can form any suitable messages (e.g., timestamps, integrity flags, GNSS corrections, etc. can be separated).

Transmitting the messages S400 preferably functions to provide GNSS corrections and integrity flag(s) to the GNSS receiver (e.g., mobile receiver, rover, etc.). S400 preferably includes transmitting the corrections message (e.g., from S200) and/or the integrity message (e.g., from S300) to an end point (e.g., router, positioning engine, etc.). The GNSS corrections can be provided over any suitable communication link (e.g., wired or wireless such as internet, satellite, telecommunication, etc.). The GNSS correction transmission can be mediated by a gateway, router, and/or any suitable communication system (such as a GNSS corrections communication system as disclosed in U.S. patent application Ser. No. 17/379,271 titled 'SYSTEM AND METHOD FOR PROVIDING GNSS CORRECTIONS' filed 19 Jul. 2021 which incorporated is in its entirety by this reference).

Transmitting the GNSS corrections preferably includes transmitting an integrity message. The integrity message can include an epoch associated with satellite observations used to monitor the corrections (e.g., a monitoring epoch associated with monitoring satellite observations), an integrity flag associated with the corrections (e.g., a flag associated with whether or not corrections have less than a threshold probability of being used to generate a positioning solution with an error greater than a threshold error), which correction(s) were monitored (e.g., associated with the epoch of satellite observations that were used to monitor the correction(s)), a time (e.g., timestamp) associated with when measurements were transmitted (e.g., from a reference station), a time (e.g., timestamp) associated with when measurements were received (e.g., by an integrity chain), a time (e.g., timestamp) associated with an integrity message was generated (e.g., by an integrity chain), a time (e.g., timestamp) associated with when an integrity message was transmitted (e.g., from a reference station), a time (e.g., timestamp) associated with when an integrity message was received (e.g., at a rover, at a GNSS receiver, etc.), a time when the corrections were generated, and/or any suitable data and/or information can be included in the integrity message. The integrity message can be transmitted in the same or a different message as the corrections data.

Determining the GNSS receiver positioning solution S500 preferably functions to determine (e.g., estimate, calculate, etc.) a kinematic solution (e.g., position, velocity, attitude, time, etc.) of the GNSS receiver. The GNSS receiver positioning solution is preferably determined using a positioning engine (e.g., a positioning engine of a computing system collocated with the GNSS receiver, a cloud positioning engine, etc.), but can be determined by any suitable component.

The GNSS receiver positioning solution is preferably determined using corrected satellite observations (e.g., the positioning satellite observations received in S100 corrected using the corrections generated in S200), but can be determined using any suitable satellite observations (e.g., uncorrected satellite observations, differenced satellite observations, etc.). The satellite observations can be precorrected (e.g., before a filter processes the satellite observations to determine the GNSS receiver positioning solution), corrected in an estimator (such as a Kalman filter, extended Kalman filter, unscented Kalman filter, particle estimator, Gaussian process, etc.; where the GNSS corrections can be an input to the estimator), and/or can otherwise be corrected.

S500 can include independently monitoring for integrity (e.g., independent of S300) of the corrections. The integrity of the corrections is preferably monitored at an integrity monitor collocated with the positioning engine (e.g., shared processor, connected processor, etc.). However, the integrity of the corrections can be monitored at a remote integrity monitor (e.g., operating on a cloud server, at a monitoring station, etc.) and/or at any suitable location.

S500 preferably monitors the integrity during the age of integrity (e.g., the time between measurement of monitoring satellite observations and an integrity flag receipt at the GNSS receiver or positioning engine, as shown for example in FIG. 3, etc.). The age of integrity is preferably less than a time to alert (e.g., so that the positioning engine integrity monitor does not need to monitor the corrections for a period of time greater than the TTA). The positioning engine typically determines the age of integrity (e.g., by adding each timing component between the measurement of the satellite observations and the positioning engine processing time such as a reference station processing time, satellite observation transmission time, integrity monitoring time, alert transmission time, positioning engine processing time, etc.; by subtracting an instantaneous time from the time the satellite observations were measured; etc.).

Typically (as shown for example in FIG. 3A) a bounding violation and the epoch of measurements from a reference station that are coherent are typically synchronous. However, a jitter (e.g., 10 ms, 50 ms, 100 ms, 200 ms, 250 ms, 500 ms, 1 s, values or ranges therebetween, a random or pseudorandom value between 0 and 1 s, etc.) can be included in the age of integrity and/or subtracted from the time of the observables (e.g., for conservativeness, to account for any asynchronicity between the bounding violation and the satellite observation measurement at the reference station, to account for time during the positioning engine processing time between determining the age of integrity and comparing the age of integrity to the threshold time, etc.). In these variants, the jitter can be subtracted by the positioning engine, the integrity chain, the reference station, and/or any suitable component. However, the age of integrity can be equal to or larger than the TTA. However, S500 can monitor the integrity during any suitable time.

When the age of integrity exceeds a threshold, the positioning engine integrity monitor can issue an integrity flags (e.g., an unavailability alert, an unsafe alert, etc.), can propagate the positioning solution, can stop propagating the positioning solution (e.g., can only propagate the positioning solution until the age of integrity exceeds a threshold), and/or can otherwise respond to an age of integrity exceeding a threshold. The age of integrity threshold can be depend on a target TTA, an IMU drift, a processing bandwidth of the positioning engine, a validity time for the corrections, a duration of time the positioning engine can propagate the positioning solution in time, a target integrity, a probability of faults, an external system application, an external system environment, and/or can depend on any suitable information. For example, the threshold age of integrity can be 0.5 s, 1 s, 2 s, 5 s, 10 s, 15 s, 20 s, 30 s, 60 s, 90 s, 120 s, 180 s, 240 s, 300 s, 600 s, values or ranges therebetween, less than 0.5 s, or greater than 600 s. In these variants, the database of observations and/or corrections may not need to be emptied (e.g., need not assume a worst-case scenario that the information in the database is faulty). When new integrity information is received (e.g., after the first age of integrity would have passed, new age of integrity information within the prior window is received; a new age of integrity window is started with a time gap between the preceding age of integrity; etc.) that indicates no predetermined events or integrity events have occurred, the positioning engine can then use the information from the database (as opposed to needing to rebuild the database).

During the age of integrity (e.g., the time during which integrity information is not available at the GNSS receiver), S500 can monitor the integrity of the corrections (in the same and/or a different manner than S300) and/or positioning solution. In a first specific example, S500 can include estimating a positioning solution in the past (e.g., using old measurements corresponding to the age of integrity such as at the start of the age of integrity), estimating a current positioning solution (e.g., using satellite observations from a subsequent epoch), determining a differenced displacement between the past positioning solution and the current positioning solution, and monitoring the integrity based on the differenced displacement (e.g., magnitude, relative value compared to a threshold, etc.). In a second specific example, S500 can include estimating a positioning solution for the current epoch (e.g., using corrections during their validity period but when an integrity of the corrections is not available at the GNSS receiver such as during the age of integrity) and detecting potential failures over time (e.g., large drift, jumps, etc.) with fast dynamics. Potential faults can be detected, for instance, using receiver autonomous integrity monitoring (RAIM), relative RAIM (RRAIM), advanced RAIM (ARAIM), extended RAIM (eRAIM), solution separation RAIM, absolute RAIM, isotropy based protection level (IBPL), modified RAIM algorithms (e.g., as disclosed for example in U.S. patent application Ser. No. 17/940,728 titled 'SYSTEM AND METHOD FOR SATELLITE POSITIONING' filed 8 Sep. 2022 which is incorporated in its entirety by this reference), innovation screening, subset monitoring, and/or in any manner. The drift is preferably monitored to make sure it is less than a threshold drift, where the threshold drift can depend on the length of the age of integrity, the protection level, an inflation rate during the age of integrity, a probability of a fault, and/or can depend on any suitable criteria. In a third example, S500 can include propagating the propagating the positioning solution determined at the start of the age of integrity (e.g., at time t-age of integrity) with IMU measurements (e.g., using dead reckoning, as disclosed in U.S. application Ser. No. 17/860,779 titled 'SYSTEM AND METHOD FOR FUSING DEAD RECKONING AND GNSS DATA STREAMS,' filed 8 Jul. 2022 or U.S. patent application Ser. No. 18/115,963 titled 'SYSTEM AND METHOD FOR FUSING SENSOR AND SATELLITE MEASUREMENTS FOR POSITIONING DETERMINATION' filed 1 Mar. 2023, each of which is incorporated in its entirety by this reference). These examples can be combined (e.g., used simultaneously, be modes of operation for the positioning engine and/or associated integrity monitor, etc.) and/or used in isolation.

In some variants, the positioning engine integrity monitor can include a time to alert which can be compared to a threshold (e.g., 4 s, 5 s, 7 s, 10 s, 20 s, 30 s, etc.). When the time to alert exceeds the threshold, the positioning engine can purge the satellite observations and/or corrections, can rely on dead reckoning positioning (e.g., operate as a fusion engine), identify the corrections as unavailable, and/or can otherwise operate and/or respond. As the lack of corrections through delay or communication outage typically will not cause a hazard (e.g., only presents an availability problem) the requirements on TTA are generally not safety critical.

The positioning solution is preferably determined using carrier phase (e.g., ambiguity resolved carrier phase), but can additionally or alternatively be determined using pseudorange, doppler, and/or any suitable satellite signal(s). Determining the positioning solution can include determining the carrier phase ambiguity (e.g., to a floating point precision, to integer precision, etc. such as disclosed in U.S. patent application Ser. No. 16/817,196 filed 12 Mar. 2020 entitled "SYSTEMS AND METHODS FOR REAL TIME KINEMATIC SATELLITE POSITIONING" or in U.S. patent application Ser. No. 17/022,924 filed 16 Sep. 2020 entitled "SYSTEMS AND METHODS FOR HIGH-INTEGRITY SATELLITE POSITIONING," each of which is incorporated in its entirety by this reference), determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

In a first illustrative example, a system for determining global navigation satellite systems (GNSS) corrections can include a corrections generator (e.g., operating on a first processor that is separate from a GNSS receiver) configured to receive a first set of satellite observations associated with a first epoch from a first set of reference stations, determine the GNSS corrections using the first set of satellite observations, transmit a GNSS corrections message (e.g., including the GNSS corrections, a timestamp associated with the first set of satellite observations, a validity time, etc.); an integrity monitor (e.g., operating on a second processor that can be the same or different from the first processor, local with or remote from the GNSS receiver, etc.) configured to receive a second set of satellite observations associated with a second epoch from a second set of reference stations, compensate the second set of satellite observations for an effect (e.g., receiver to reference time scale clock offset, receiver differential code biases, etc.) to generate a set of compensated satellite observations; when a residual difference between the GNSS corrections and the second set of compensated satellite observations is less than a threshold, generate an integrity flag indicating the GNSS corrections are valid, when the residual difference is greater than or equal to the threshold, generate the integrity flag indicating the GNSS corrections are not valid; and, transmit an integrity message (e.g., the integrity flag, a timestamp associated with the second epoch, etc.); and a positioning engine (e.g., operating on a third processor collocated with the GNSS receiver) configured to receive the GNSS corrections, the timestamp associated with the first epoch, and the timestamp associated with the second epoch, determine a correction integrity age (e.g., CIA, age of integrity, etc.) using at least one of the timestamp associated with the first epoch or the timestamp associated with the second epoch, when the CIA is less than a target time, correct a third set of GNSS corrections received by the GNSS receiver using the GNSS corrections, where the corrected third set of GNSS corrections are used to determine a position of the GNSS receiver; and when the CIA is greater than the target time or the alert is generated, determine the position of the GNSS receiver using the third set of GNSS corrections without correcting the third set of GNSS corrections. In variations of the first illustrative example an integrity risk of the position of the GNSS receiver or a protection level associated with the position of the GNSS receiver can depend on the CIA. In variations of the first illustrative example, when the CIA is less than the target time, the integrity risk is less than $10^{-7}$/hr and the protection level is at most 2 m. In variations of the first illustrative example, the second processor can iteratively determine the protection level based on a relationship (e.g., $IR = P(|x-\hat{x}|>PL) = \Sigma_i P(H_i) \cdot P(|x-\hat{x}|>PL|H_i) \cdot P(MD||x-\hat{x}|>PL, H_i)$) between an integrity risk (IR), a number of feared events (N) where the summation extends from i=0 (e.g., the nominal case) up to N, $P(H_i)$ the (state) probability to be in condition $H_i$ (where $H_0$ is the nominal condition and other values of i are associated with the presence of a feared event), $P(|x-\hat{x}|>PL|H_i)$ is the probability (also called conditional risk) that an error exceed the protection level in condition $H_i$ (e.g., probability of impact), $P(MD||x-\hat{x}|>PL, H_i)$ is the probability the integrity chain (e.g., integrity monitor) misses detection of the feared event in the current conditions (e.g., satellites, satellite geometry, reference stations, etc.), x is the actual positioning solution (e.g., of the GNS receiver), and $\hat{x}$ is the estimated position; wherein the (target) integrity risk depends on the CIA. In variations of the first illustrative example, the target time can be about 6 seconds. In variations of the first illustrative example, the second processor can determine the CIA by subtracting a jitter from the at least one of the timestamp associated with the first epoch or the timestamp associated with the second epoch. In variations of the first illustrative example the jitter can account for differences in time between a bounding violation due to a feared event occurring and receiving the second set of satellite that are coherent with the bounding violation.

In a second illustrative example, a method can include receiving a set of satellite observations from a set of reference stations; transmitting, during an observations transmission time, the set of satellite observations to a corrections integrity chain after a station processing time; at the corrections integrity chain, during an integrity checking time, checking global navigation satellite signals (GNSS) corrections for an integrity violation and generating integrity flags (e.g., alerts) for whether there the integrity violation has occurred; transmitting, during an integrity flag transmission time, the integrity flags to a positioning engine; and at the positioning engine, processing the integrity flags during a positioning engine processing time; wherein the positioning engine determines an age of integrity of the GNSS corrections that accounts for the observations transmission time, the station processing time, the integrity checking time, the integrity flags transmission time, and the positioning engine processing time. In variations of the second illustrative example, the positioning engine can receive GNSS receiver satellite observations from a GNSS receiver and determine a positioning solution of the GNSS receiver using the GNSS receiver satellite observations, wherein an integrity of the positioning solution depends on the age of integrity. In variations of the second illustrative example, the integrity can include a protection level, wherein the method further comprises at the positioning engine, determining a protection level of the positioning solution by iteratively evaluating, for a plurality of integrity risks, a relationship (e.g., such as the relationship shown in the first illustrative example above) between each target integrity risk and a number of feared events, an impact of each feared event, a probability of the feared event occurring, and a probability of missed detection of the feared event; wherein the plurality of target integrity risks depends on the age of integrity. In variations of the second illustrative example, the positioning engine can receive the GNSS corrections, determine integer-valued ambiguities for carrier phases of the GNSS receiver satellite observations based on the GNSS corrections; where the positioning solution can be determined based on the integer-valued ambiguities. In variations of the second illustrative example, the corrections integrity chain can be implemented on a processor that is remote from the GNSS receiver. In variations of the second illustrative example, the positioning engine can be certified to meet at least ASIL-B safety standards. In variations of the second illustrative example, the age of integrity can account for a jitter time, wherein the jitter time comprises an amount of time between a bounding violation resulting from a feared event and a measurement time of the set of satellite observations that is coherent with the bounding violation (e.g., by adding or subtracting a jitter to the age of integrity). In variations of the second illustrative example, the positioning engine can monitor the integrity of the positioning solution autonomously from the corrections integrity chain for the duration of the age of integrity. In variations of the second illustrative example, the positioning engine can run on a processor collocated with the GNSS receiver. In variations of the second illustrative example, the method can include receiving a second set of satellite observations from a second set of reference stations, wherein the second set of satellite observations are independent of the set of satellite observations; and generating the GNSS corrections using the second set of satellite observations. In variations of the second illustrative example, generating the GNSS corrections can include generating the GNSS corrections using a Gaussian process, wherein the GNSS corrections comprise independent corrections for an atmospheric delay, a satellite clock delay, a satellite hardware bias, and a satellite orbit offset. In variations of the second illustrative example, the method can include at a second corrections integrity chain, during a second integrity checking time, checking global navigation satellite signals (GNSS) corrections for the integrity violation and generating a second integrity flag for whether there the integrity violation has occurred; wherein the positioning engine processes the second integrity flag, and where the age of integrity comprises the greater of an age of integrity determined based on the corrections integrity chain and an age of integrity determined based on the second corrections integrity chain. In variations of the second illustrative example, the second corrections integrity chain can be independent of the corrections integrity chain.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PUT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for determining global navigation satellite systems (GNSS) corrections comprising:
   a first remote processor, separate from a GNSS receiver, configured to:

receive a first set of satellite observations associated with a first epoch from a first set of reference stations;

determine the GNSS corrections using the first set of satellite observations; and transmit the GNSS corrections and optionally a timestamp associated with the first epoch;

a second remote processor, separate from the GNSS receiver, configured to:

receive a second set of satellite observations associated with a second epoch from a second set of reference stations;

compensate the second set of satellite observations to generate a set of compensated satellite observations;

when a residual difference between the GNSS corrections and the set of compensated satellite observations is less than a threshold, generate an integrity flag indicating the GNSS corrections are valid; and when the residual difference is greater than or equal to the threshold, generate the integrity flag indicated the GNSS corrections are not valid;

transmit a timestamp associated with the second epoch and the integrity flag; and a local processor, collocated with the GNSS receiver, configured to:

receive the GNSS corrections, the timestamp associated with the second epoch, and the integrity flag;

determine a correction integrity age (CIA) using the timestamp;

when the CIA is less than a target time, correct a third set of GNSS corrections received by the GNSS receiver using the GNSS corrections, wherein the corrected third set of GNSS corrections are used to determine a position of the GNSS receiver; and when the CIA is greater than the target time or the integrity flag indicates the GNSS corrections are not valid, determine the position of the GNSS receiver using the third set of GNSS corrections without correcting the third set of GNSS corrections.

2. The system of claim 1, wherein an integrity risk of the position of the GNSS receiver or a protection level associated with the position of the GNSS receiver depends on the CIA.

3. The system of claim 2, wherein when the CIA is less than the target time, the integrity risk is less than $10^{-7}$/hr and the protection level is at most 2 m.

4. The system of claim 2, wherein the local processor is configured to iteratively determine the protection level based on a relationship between a target integrity risk, a number of feared events, an impact of each feared event, a probability of the feared event occurring, and a probability of missed detection of the feared event; wherein the target integrity risk depends on the CIA.

5. The system of claim 1, wherein the target time is about 6 seconds.

6. The system of claim 1, wherein the local processor is further configured to determine the CIA by subtracting a jitter from the at least one of the timestamp associated with the first epoch or the timestamp associated with the second epoch.

7. The system of claim 6, wherein the jitter accounts for differences in time between a bounding violation due to a feared event occurring and receiving the second set of satellite that are coherent with the bounding violation.

8. A method comprising:

receiving a set of satellite observations from a set of reference stations;

transmitting, during an observations transmission time, the set of satellite observations and global navigation satellite signals (GNSS) corrections to a corrections integrity chain after a station processing time;

at the corrections integrity chain, during an integrity checking time, checking the GNSS corrections for an integrity violation and generating an integrity flag indicating whether the integrity violation has occurred;

transmitting, during an integrity flag transmission time, the integrity flag to a positioning engine; and at the positioning engine, processing the integrity flag during a positioning engine processing time;

wherein the positioning engine determines an age of integrity of the GNSS corrections that accounts for the observations transmission time, the station processing time, the integrity checking time, the integrity flag transmission time, and the positioning engine processing time.

9. The method of claim 8, further comprising at the positioning engine:

receiving GNSS receiver satellite observations from a GNSS receiver; and determining a positioning solution of the GNSS receiver using the GNSS receiver satellite observations, wherein an integrity of the positioning solution depends on the age of integrity.

10. The method of claim 9, wherein the integrity comprises a protection level, wherein the method further comprises at the positioning engine, determining a protection level of the positioning solution by iteratively evaluating, for a plurality of integrity risks, a relationship between each target integrity risk and a number of feared events, an impact of each feared event, a probability of the feared event occurring, and a probability of missed detection of the feared event; wherein the plurality of target integrity risks depends on the age of integrity.

11. The method of claim 9, further comprising at the positioning engine:

receiving the GNSS corrections;

determining integer-valued ambiguities for carrier phases of the GNSS receiver satellite observations based on the GNSS corrections;

wherein the positioning solution is determined based on the integer-valued ambiguities.

12. The method of claim 9, wherein the corrections integrity chain is implemented on a processor that is remote from the GNSS receiver.

13. The method of claim 12, wherein the positioning engine is certified to meet at least ASIL-B safety standards.

14. The method of claim 9, wherein the age of integrity further accounts for a jitter time, wherein the jitter time comprises an amount of time between a bounding violation resulting from a feared event and a measurement time of the set of satellite observations that is coherent with the bounding violation.

15. The method of claim 9, further comprising, at the positioning engine, monitoring the integrity of the positioning solution autonomously from the corrections integrity chain for the duration of the age of integrity.

16. The method of claim 9, wherein the positioning engine runs on a processor collocated with the GNSS receiver.

17. The method of claim 8, further comprising:

receiving a second set of satellite observations from a second set of reference stations, wherein the second set of satellite observations are independent of the set of satellite observations; and generating the GNSS corrections using the second set of satellite observations.

18. The method of claim 17, wherein generating the GNSS corrections comprises generating the GNSS corrections using a Gaussian process, wherein the GNSS corrections comprise independent corrections for an atmospheric delay, a satellite clock delay, a satellite hardware bias, and a satellite orbit offset.

19. The method of claim 8, further comprising, at a second corrections integrity chain, during a second integrity checking time, checking the GNSS corrections for the integrity violation and generating a second integrity flag for whether there the integrity violation has occurred; wherein the positioning engine processes the second integrity flag, and wherein the age of integrity comprises the greater of an age of integrity determined based on the corrections integrity chain and an age of integrity determined based on the second corrections integrity chain.

20. The method of claim 19, wherein the second corrections integrity chain is independent of the corrections integrity chain.

* * * * *